(12) United States Patent
Tsuchida et al.

(10) Patent No.: US 6,559,439 B1
(45) Date of Patent: May 6, 2003

(54) IMAGE TAKING LENS UNIT WITH FRAME MEMBER FOR POSITIONING LENS AND SUBSTRATE

(75) Inventors: Hirofumi Tsuchida, Kunitachi (JP); Yasuo Nakajoh, Niiza (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/460,801

(22) Filed: Dec. 15, 1999

(51) Int. Cl.[7] ............................. H01J 40/14; H01J 5/02
(52) U.S. Cl. ..................... 250/239; 250/216; 359/819
(58) Field of Search ............................... 250/208.1, 216, 250/239, 201.1, 201.2; 359/811, 819

(56) References Cited

U.S. PATENT DOCUMENTS

| | | | | |
|---|---|---|---|---|
| 4,055,761 A | * | 10/1977 | Shinomura | 250/239 |
| 5,801,374 A | * | 9/1998 | Campbell et al. | 250/208.1 |
| 5,896,403 A | | 4/1999 | Nagasaki et al. | 371/37.1 |
| 6,266,197 B1 | * | 7/2001 | Glenn et al. | 359/819 |

* cited by examiner

Primary Examiner—Stephone B. Allen
Assistant Examiner—Eric Spears
(74) Attorney, Agent, or Firm—Pillsbury Winthrop LLP

(57) ABSTRACT

An image taking optical unit comprises an image taking optical system including a lens, an image pick-up element mounting substrate on which an image pick-up element chip is mounted, and a frame member for retaining the both. The frame member comprises a lens positioning face and a substrate positioning face, both of which cooperate to align centers of the lens and chip and position them with a suitable distance. The lens positioning face comprises a vertically lens positioning section for determining a vertical lens position and a horizontally lens positioning section for determining a horizontal lens position. The substrate positioning face comprises a vertically substrate positioning section for determining a vertical substrate position and a horizontally substrate positioning section for determining a horizontal substrate position. The vertically substrate positioning section comprises z direction positioning portion against which an upper surface of the substrate is pressed and the horizontally substrate positioning section comprises x and y direction positioning portions against which side faces of the substrate are pressed.

29 Claims, 16 Drawing Sheets

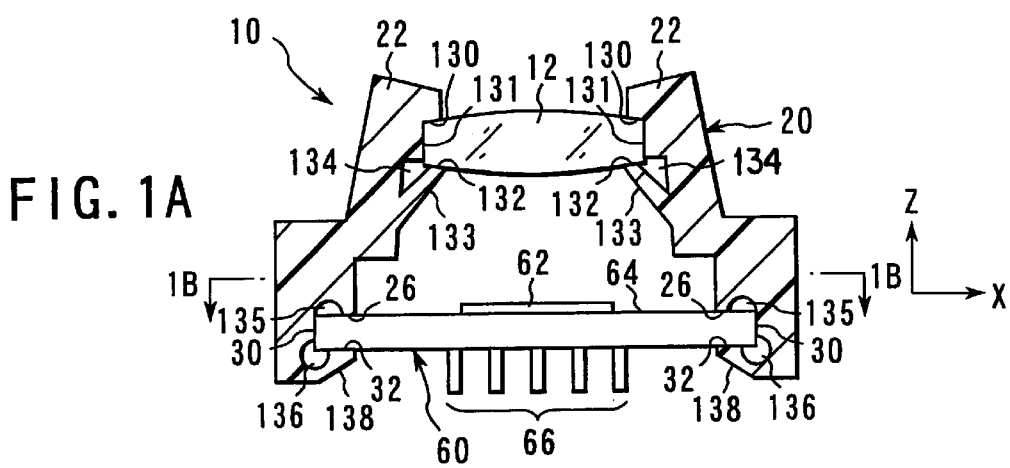
FIG. 1A
FIG. 1B
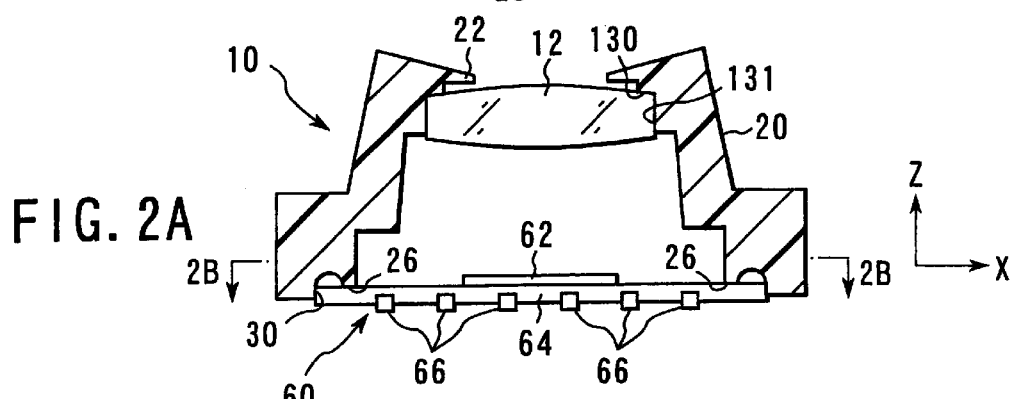
FIG. 2A
FIG. 2B

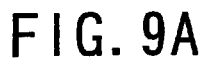
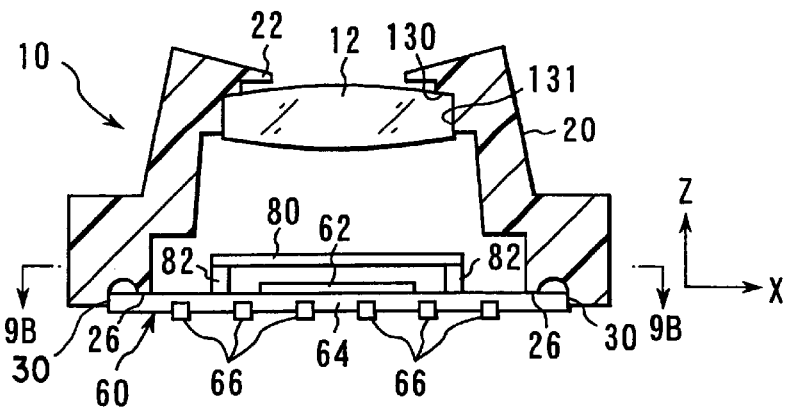
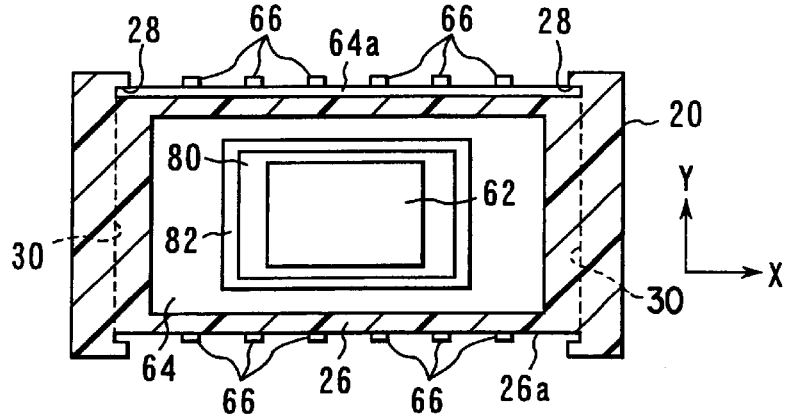
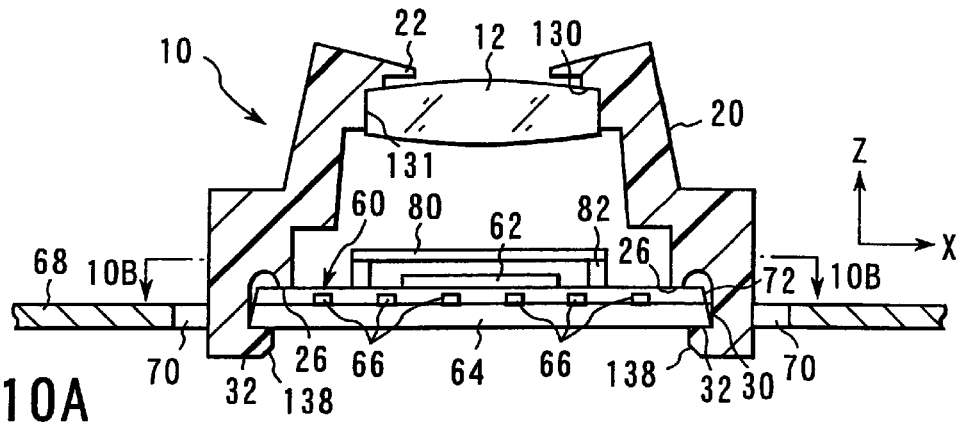
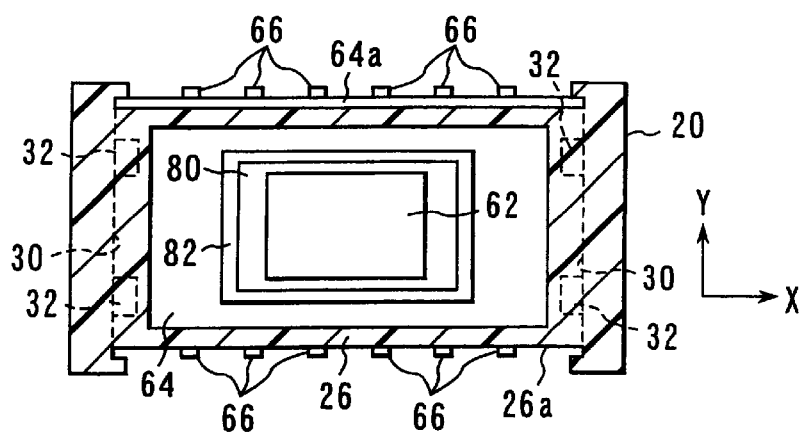

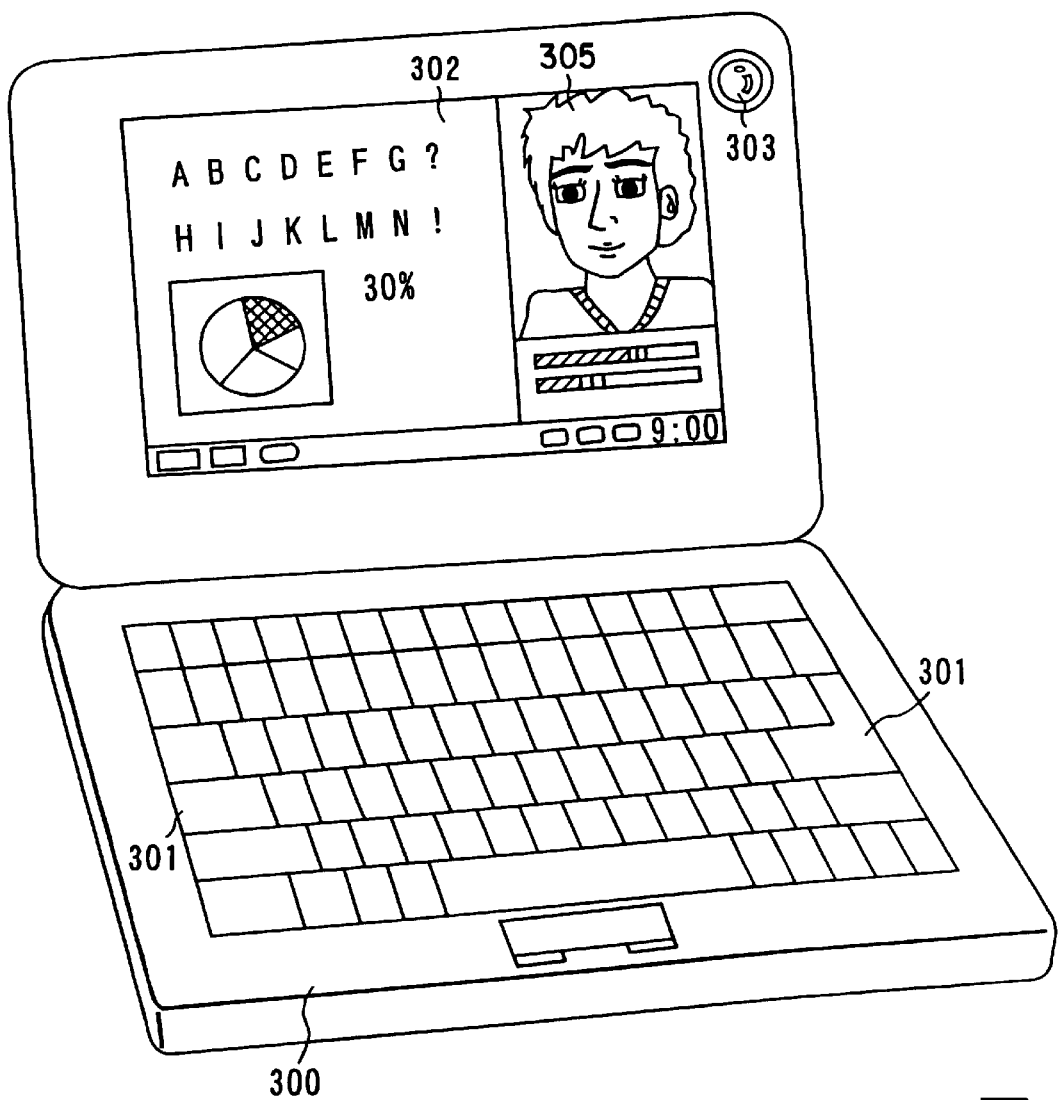
FIG. 25
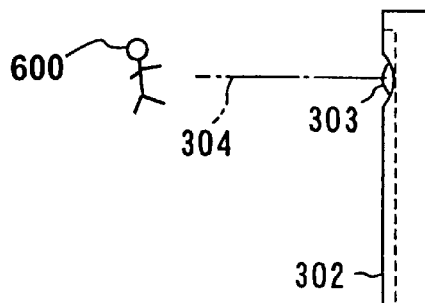
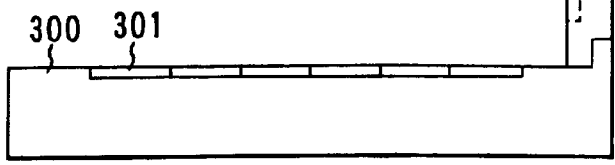
FIG. 26

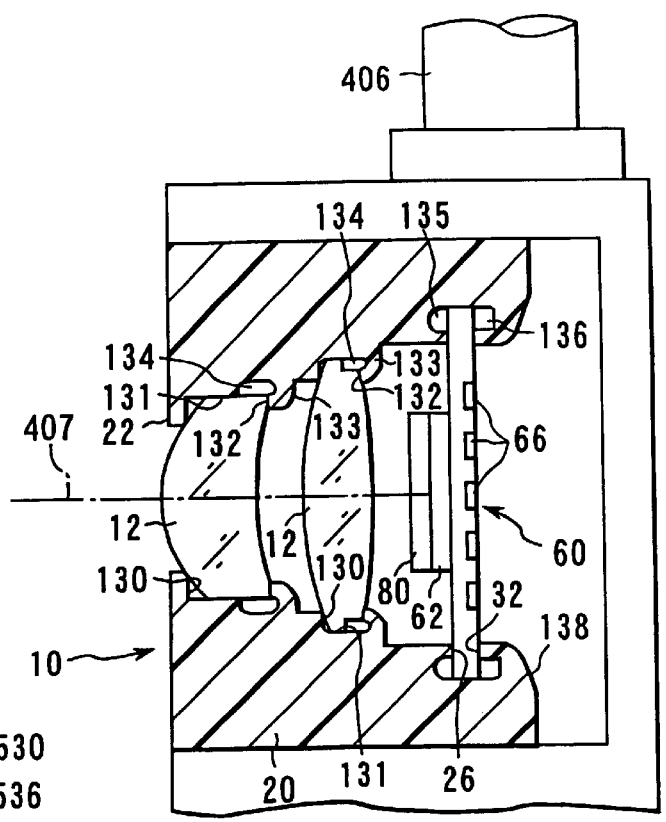
FIG. 30
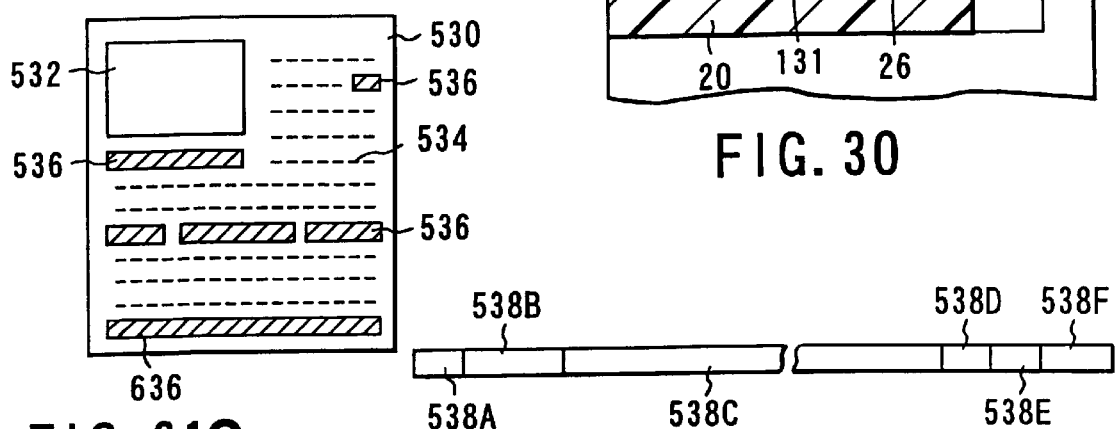
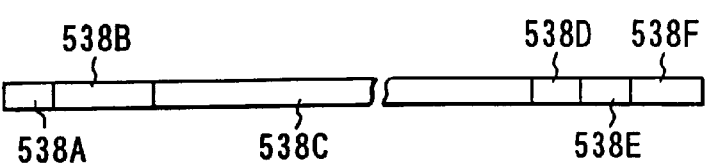
FIG. 31B
FIG. 31C
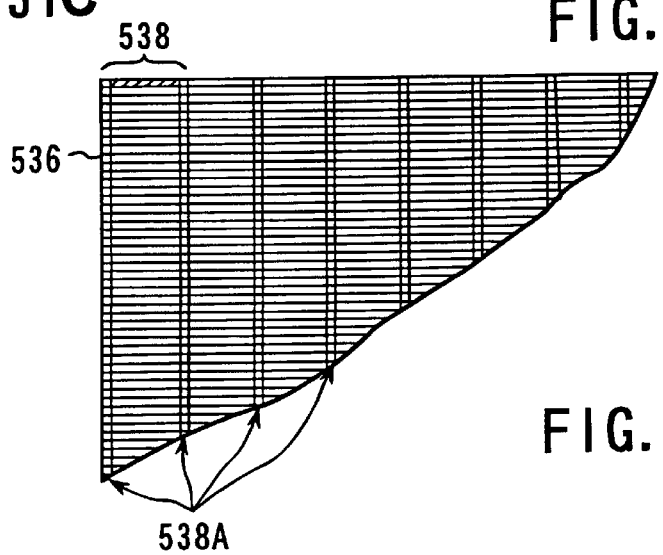
FIG. 31A

IMAGE TAKING LENS UNIT WITH FRAME MEMBER FOR POSITIONING LENS AND SUBSTRATE

BACKGROUND OF THE INVENTION

The present invention relates to an image taking lens unit with an image pick-up element chip incorporated in a lens mount frame.

Conventionally, an image taking lens unit has a lens mount frame normally including a plurality of lenses, a flat plate-like optical element, such as an infrared (IR) cut filter, and a substrate with an image pick-up element chip mounted thereon. The optical element and image pick-up element chip mounting substrate are held in a recess in the lens mount frame with a cushion rubber provided between the optical element and the chip. A resultant structure is covered with a mounting member, which is then fixed by screws, etc., to the lens mount frame, so that the optical element and image pick-up element chip mounting substrate are mounted in place on the lens mount frame.

In an electronic image taking device using such an image taking lens unit, a current tendency has been speedily toward obtaining a compact and low-cost unit. Therefore, there is a growing demand for a compact and low-cost image taking lens unit itself.

BRIEF SUMMARY OF THE INVENTION

The present invention has been achieved with such a current situation in view and the object of the present invention is to provide a compact and low-cost image taking lens unit.

The image taking lens unit according to the present invention comprises an image taking optical system for forming an image of an object, an image pick-up element mounting substrate having an image pick-up element chip for receiving the image, and a frame member for retaining the image taking optical system and image pick-up element mounting substrate in place. The image pick-up optical system includes a lens, which has an entrance optical surface near the object and an exit optical surface near the image pick-up element chip, both of which are opposite to each other. The frame member has lens positioning face for positioning the lens and substrate positioning face for positioning the image pick-up element mounting substrate. The lens positioning face and substrate positioning face cooperate to align a center of the lens and a center of the image pick-up element chip and position the lens and the image pick-up element chip with a suitable distance.

The image taking lens unit allows the image taking lens and image pick-up element mounting substrate to be easily set in the frame unit. At the setting time, lens positioning face and substrate positioning face cooperate to align a center of the lens and a center of image pick-up element chip, such that centering adjustment is made automatically. Further, the lens positioning face and substrate positioning face cooperate to position the lens and chip with a suitable distance based on the lens design data, which allows the chip to be on an image formation plane of an image pick-up optical system. Therefore, the generation of a focusing blur resulting from a displacement from an optimal distance between the lens and the chip is automatically prevented. As a result, the assembling accuracy and productivity are both improved.

The substrate positioning face is preferably formed on an inner wall surface of the frame member so as to facilitate the assembling of the image taking lens unit on an associated device.

The lens positioning face may be either on the outer peripheral surface of the frame member or on the inner wall surface of the frame member. However, in order to achieve a compact image taking lens unit and readier assembly of the image taking lens unit on the associated device, the lens positioning face is preferably on the inner wall surface of the frame member.

The lens may comprise not only a single lens but also a cemented doublet lens. Further, the image pick-up optical system may have any other lens and, in accordance with the addition of such a lens, the frame member may have corresponding lens positioning face. That is, the image pick-up optical system may have a plurality of lenses and the frame member may have a corresponding member of lens positioning faces.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a vertical cross-sectional view showing an image taking lens unit according to a first embodiment of the present invention;

FIG. 1B is a horizontal cross-sectional view, taken along line 1B—1B in FIG. 1A, showing the image taking lens unit;

FIG. 2A is a vertical cross-sectional view showing an image taking lens unit according to a second embodiment of the present invention;

FIG. 2B is a horizontal cross-sectional view, taking along line 2B—2B in FIG. 2A, showing the image taking lens unit;

FIG. 9A is a vertical cross-sectional view showing an image taking lens unit according to a fifth embodiment of the present invention;

FIG. 9B is a horizontal cross-sectional view, taken along line 9B—9B in FIG. 9A, showing the image taking lens unit;

FIG. 10A is a vertical cross-sectional view showing an image taking lens unit according to a sixth embodiment of the present invention;

FIG. 10B is a horizontal cross-sectional view, as taken along line 10B—10B in FIG. 10A, showing the image taking lens unit;

FIG. 22 is a front perspective view showing the electronic camera with the image taking lens unit incorporated into the objective optical system;

FIG. 23 is a back perspective view showing the electronic camera shown in FIG. 22;

FIG. 24 is a cross-sectional view showing the electronic camera shown in FIGS. 22 and 23;

FIG. 25 is a perspective view showing a personal computer with the image taking lens unit of the present invention incorporated therein;

FIG. 26 is a perspective view showing the personal computer shown in FIG. 25;

FIG. 30 is a cross-sectional view showing the image taking lens unit incorporated into the hand-held telephone device shown in FIGS. 25 and 26;

FIGS. 31A, 31B and 31C show data reproduced by an information reproducing system using the image taking lens unit of the present invention;

DETAILED DESCRIPTION OF THE INVENTION

First Embodiment

Figure 3:
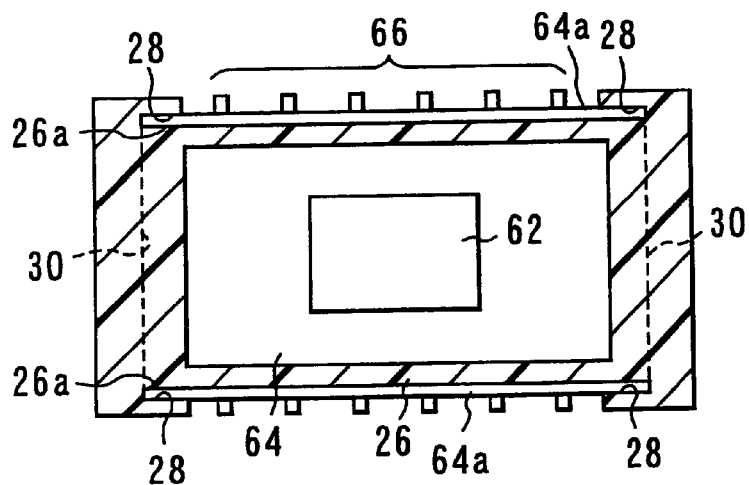
FIG. 3 shows a variant of the image taking lens unit according to the second embodiment.

With reference to FIGS. 1A and 1B, an explanation will be made about an image taking lens unit according to a first embodiment of the present invention.

As shown in FIGS. 1A and 1B, an image taking lens unit 10 has a lens 12, an image pick-up element mounting substrate 60 and a frame member, that is, a lens mount frame 20, for holding these in place.

The lens 12 has an entrance optical surface near an object and an exit optical surface near an image pick-up element chip, both of which are opposite to each other. The lens has an optical axis which is defined by an imaginary line passing through a center of curvature of the entrance optical surface and a center of curvature of the exit optical surface.

The lens mount frame 20 has lens positioning face for positioning the lens 12. The lens positioning face is constituted by a portion of an inner wall surface of the lens mount frame 20. The lens positioning face has a vertically lens positioning section 130 making contact with the entrance optical surface of the lens 12 to determine a vertical position of the lens 12 and a horizontally lens positioning section 131 for determining a horizontal position of the lens 12.

As used herein, the term "vertically" is subjected to a direction parallel to the optical axis of the lens 12 and it corresponds to a z direction in FIG. 1A. Further the term "horizontally" is subjected to any direction perpendicular to the optical axis of the lens 12 and it is represented by a linear equation of x and y directions in FIG. 1B.

The image pick-up element mounting substrate 60 has an image pick-up element chip 62, a support substrate 64 for supporting the chip and a plurality of terminals 66. The support substrate 64 has an upper surface and a lower surface and the chip 62 is arranged on the upper surface of the support substrate 64. The support substrate 64 may have any given shape, such as a circular or polygonal shape, but it has desirably a rectangular shape, that is, a rectangle or square. The shown preferable support substrate 64 has a rectangular configuration and thus has two pairs of side faces, that is, four side faces in total.

The terminals 66 project in a downward direction (−z direction) from the lower surface of the support substrate 64 but this invention is not restricted thereto. The terminals 66 may project in a horizontal direction (y or x direction) from the side face of the support substrate 64, or may project both in a downward direction from the lower surface of the support substrate 64 and in the horizontal direction from the side face of the support substrate 64. Further, the terminals 66 not only project from the support substrate 64 but also may extend on the outer surface of the support substrate 64 except for the upper surface of the support substrate 64.

The lens mount frame 20 further has a substrate positioning face for positioning the image pick-up element mounting substrate 60. The substrate positioning face is constituted by a portion of the inner wall surface of the lens mount frame 20. The substrate positioning face has a vertically substrate positioning section for determining a vertical position of the image pick-up element mount substrate 60 and a horizontally substrate positioning section for determining a horizontal position of the image pick-up element mounting substrate 60. The vertically substrate positioning section has a z direction substrate positioning portion 26 for determining the position of the image pick-up element mounting substrate 60 in the z direction in FIG. 1A and the horizontally substrate positioning section has x direction substrate positioning portions 30 and y direction substrate positioning portions 28 for determining the position of the image pick-up element mounting substrate 60 in the x and y directions in FIG. 1B.

The horizontally lens positioning section 131 prevents occurrence of a decentration aberration resulting from the shift of the lens 12 in the horizontal direction, there is, in the x direction and/or y direction.

Further, the vertically lens positioning section 130 and horizontally lens positioning section 131 cooperate to prevent occurrence of a decentration aberration resulting from the tilt of the lens 12.

Further, the x direction substrate positioning portions 30 and y direction substrate positioning portions 28 prevent a displacement of an image receiving surface resulting from the shift of the image pick-up element chip in the horizontal direction, that is, in the x direction and/or y direction.

Further, the vertically lens positioning section 130 and z direction substrate positioning portion 26 cooperate to arrange the lens 12 and image pick-up element chip 62 in a suitable distance based on lens design data, that is, in a spacing in which the chip 62 is positioned on an image formation surface of the lens 12. Consequently, a focusing blur resulting from a displacement from an optimal distance between the lens 12 and the image pick-up element chip 62 is prevented.

The lens mount frame 20 has projections having a lens engaging portion 132 for pressing the lens 12 against the positioning section 130 to fix it in place. The projections having the lens engaging portion 132 are made of an elastic member and, in order to easily insert the lens 12, has a taper section 133 for the lens which is inclined toward an inner side. The projections having the lens engaging portion 132 are outwardly bent as the lens is inserted upwardly from below, and the bent portions of the projections are pushed aside into spaces 134 to allow the lens to pass and are elastically returned to an original position after the lens 12 has been passed. As a result, the exit optical surface and entrance optical surface of the lens 12 are pressed by the lens engaging portions 132 and lens positioning section 130 and, as shown in FIGS. 1A and 1B, the lens 12 is sandwiched between the vertically lens positioning section 130 and the lens engaging portions 132 and fixed in place. According to the present embodiment, a means for fixing the lens in place comprises elastic projections having a lens engaging portion 132.

Although, in the present embodiment, the means for fixing the lens 12 in place comprises the lens engaging portions 132, the present invention is not restricted thereto and it may be any proper element for pressing the lens 12 against the positioning section 130 to fix it in place and may be a bonding agent for instance.

Further, the lens mount frame 20 has projections having a substrate engaging portion 32 for pressing the image pick-up element mounting substrate 60 against a z direction positioning portion 26 to fix it in place. The projections having the substrate engaging portion 32 are made of an elastic member and, in order to easily insert the substrate 60, have tapered portions 138 for the substrate which is inclined toward an inside. And a projection defining the z direction positioning portion 26 is also made of an elastic member. The projections having the substrate engaging portion 32 are outwardly bent as the image pick-up element mounting substrate 60 is inserted upwardly from below and is pushed aside into a space 136 to allow the passage of the substrate 60. As the image pick-up element mounting substrate 60 is further inserted, the projection defining the z direction positioning portion 26 is bent toward an inside to allow the image pick-up element mounting substrate 60 to be pushed toward a space 135. After the insertion of the image pick-up element substrate 60 is finished, the projections having the substrate engaging portion 32 are returned back to an original posture and the projection defining the z direction substrate positioning portion 26 is also returned to an original position while downwardly pressing back the substrate 60. As a result, the upper and lower surfaces of the substrates 60 are pressed by the z direction positioning portion 26 and substrate engaging portions 32 and, as shown in FIGS. 1A and 1B, the substrate 60 is sandwiched between the z direction substrate positioning portion 26 and the substrate engaging portions 32. According to the present embodiment, therefore, a means for fixing the image pick-up element mounting substrate 60 in place comprises elastic projections having the substrate engaging portion 32.

Although, in the present embodiment, the means for fixing the image pick-up element mounting substrate 60 in place comprises the projections having the substrate engaging portion 32, the present invention is not restricted thereto and it may comprise any proper element pressing the substrate 60 against the z direction substrate positioning portion 26 to fix it in place and may be a bonding agent for example.

The lens positioning section 130 shields light at the peripheral surface of the lens 12 and acts as a "stop". That is, a projection defining the lens positioning section 130 serves also as a "stop" section 22 shielding light on the peripheral surface of the lens 12. The "stop" section 22 may be provided by a different member from the projection defining the lens positioning section 130.

The image taking lens unit 10 according to the present invention can be readily assembled simply by fitting the lens 12 and image pick-up element chip mounting substrate 60 into the lens mount frame 20. Further, the center of the lens 12 and that of the image pick-up element chip 62 are automatically set in a substantially aligned way. That is, centering adjustment is automatically made and the lens 12 and the image pick-up element chip 62 are located with a distance substantially equal to a designed value. Thus, the image taking lens unit can be manufactured at low costs and high production level with high accuracy of assembly.

Second Embodiment

With reference to FIGS. 2A and 2B, an explanation will be made about an image taking lens unit according to a second embodiment of the present invention. In these Figures, those members of this embodiment indicated by the same reference numerals as those of the first embodiment show corresponding members and any detailed explanation is, therefore, omitted to avoid duplication.

As shown in FIGS. 2A and 2B, an image taking lens unit 10 has a lens 12, a lens mount frame 20 for retaining the lens and an image pick-up element mounting substrate 60.

The lens mount frame 20 has lens positioning face for positioning the lens 12, that is, a vertically lens positioning section 130 and horizontally lens positioning section 131. The lens 12 is fixed to the lens positioning face by a bonding agent or pressing operation. According to the present embodiment, therefore, a means for fixing the lens 12 comprises a bonding agent or lens positioning face itself.

The lens mount frame 20 has an extending section 22 extending toward a front of the lens 12 and extending as a "stop" with respect to the lens. That is, the lens mount frame 20 includes, in addition to a section for defining a vertically lens positioning section 130, a "stop" section 22.

The image pick-up element substrate 60 has an image pick-up element chip 62, a rectangular support substrate 64 supporting the chip and a plurality of terminals 66. The terminals 66 are positioned on one pair of opposite side surfaces of a rectangular support substrate 64. That is, the image pick-up element mounting substrate 60 has such terminals in two directions (+y and −y directions) only.

The lens mount frame 20 has, further, substrate positioning face for positioning the image pick-up element mounting substrate 60. The substrate positioning face is constituted by a portion of the inner wall surface of the lens mount frame 20. The substrate positioning face has a vertically substrate positioning section for determining a vertical position of the image pick-up element mounting substrate 60 and a horizontally substrate positioning section for determining a horizontal position of the image pick-up element mounting substrate 60. The vertically substrate positioning section has a z direction positioning portion 26 for determining the position of the image pick-up element mounting substrate 60 in the z direction in FIG. 2A. The horizontally substrate positioning section comprises one pair of x direction substrate positioning portions 30 for determining the position of the image pick-up element mounting substrate 60 in the x direction in the Figures and two pairs of y direction substrate positioning portions 28 for determining the position of the image pick-up element mounting substrate 60 in the y direction in the Figure.

The image pick-up element mounting substrate 60 is positioned in the z direction by being pressed against the z direction positioning portion 26. That is, by such a pressing operation, a distance between the lens 12 and the image pick-up element chip 62 is automatically set to a desired designed value.

Further, the image pick-up element mounting substrate 60 is positioned in the y direction by being pressed against the y direction positioning portions 28. Further, the image pick-up element mounting substrate 60 is positioned in the x direction by being pressed against the x direction positioning portions 30.

By, in this way, pressing the image pick-up element mounting substrate 60 against the y direction positioning portions 28 and x direction position portions 30, the image pick-up element chip 62 has its position automatically adjusted in a direction perpendicular to the axis of the lens 12, that is, in a horizontal direction and, normally, the center of the chip is set on the axis of the lens 12. After this positioning has been completed, the image pick-up mounting substrate 60 is fixed to the lens mount frame 20 by a bonding. Thus in the present embodiment, a means for fixing the lens 12 in place may be a bonding agent.

The image pickup lens unit 10 according to the present embodiment can be made compact because the component parts are less in number and very simple. The manufacturing cost can be suppressed to a low level because position adjustment among the optical component parts is completed simply by positioning the image pick-up element mounting substrate 60 against the lens mount frame 20.

According to the present embodiment, as shown in FIG. 2B, the y direction width of the support substrate 64 is made greater than a distance between the +y and −y side y direction substrate positioning portions 28. For this reason, the positioning in the y direction is made by, for example, pressing the side face of the support substrate 64 against the +y side y direction positioning portions 28. However, this is not restricted thereto.

As shown in FIG. 3 for example, the ±y direction width of the support substrate 64 may be made to substantially correspond to a distance between the +y and −y side y direction substrate positioning portions 28. Consequently, upon assembly, the support substrate 64 has its two pairs of side faces positioned against the x direction positioning portions 30 in the x direction, against the y direction positioning portions 28 in the y direction and against the z direction positioning portion 26 in the z direction.

Figure 4:
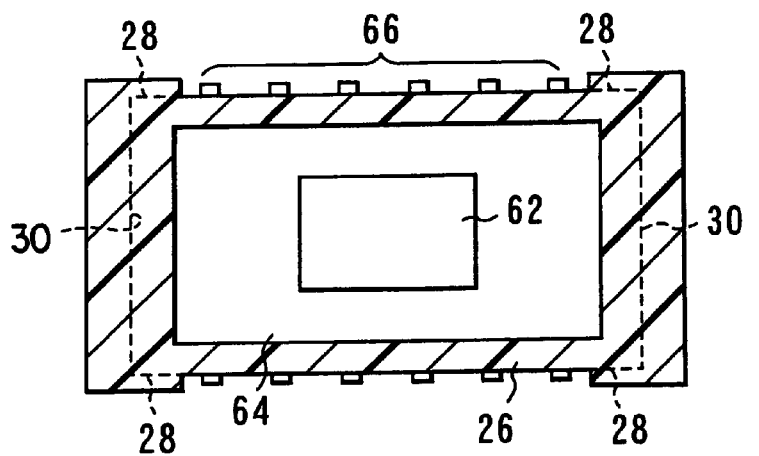
FIG. 4 shows another variant of the image taking lens unit according to the second embodiment.

Further, the z direction positioning portion 26 is not restricted to the case where its y direction end side 26a is spaced apart from the y direction positioning portions 28 as shown in FIGS. 2B and 3 and it may have its y direction end side 26a made continuous with the y direction positioning portions 28 as shown in FIG. 4 for example. Since, in FIG. 4, both the ±y side y direction end sides 26a coincide with both ±y side ends 64a of the support substrate 64, the terminals 66 only are seen and the ends 64a of the support substrate 64 are hidden at the z direction positioning portion 26. (Both the ±y side ends 64a of the support substrate 64 are seen in FIG. 3 and only one +y side end 64a is seen in FIG. 2B.)

Figure 5:
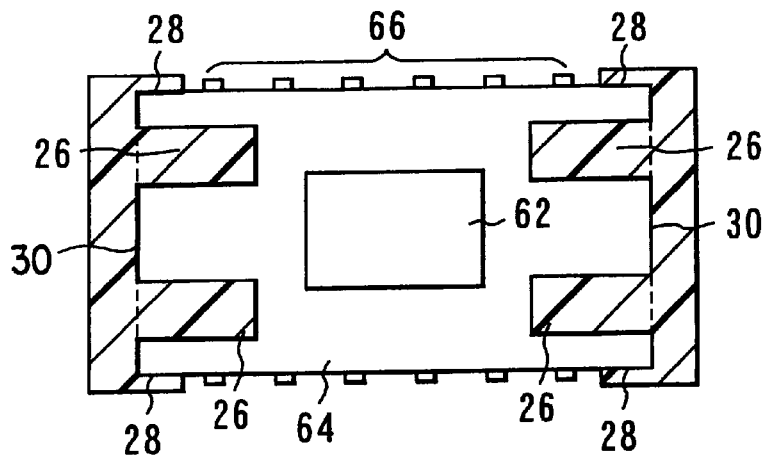
FIG. 5 shows a still another variant of the image taking lens unit according to the second embodiment.

Further, in FIGS. 2B, 4 and 3, the z direction positioning portion 26 extend along the quadrilateral edge of the support substrate 64 and, hence, the vertically positioning section has a single z direction positioning portion 26, but the present invention is not restricted thereto. As shown in FIG. 5 for example, a plurality of mutually spaced-apart z direction positioning portions 26, for example, two pairs of them, that is, four in total, may be provided.

Figure 6:
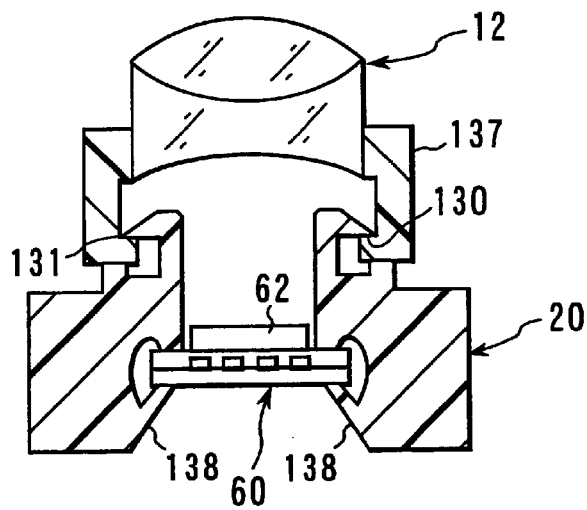
FIG. 6 shows a further variant of the image taking lens unit according to the second embodiment.

Although, in the present embodiment, the lens positioning sections 130 and 131 and substrate positioning portions 26, 28 and 30 are provided on the inner wall surface of the lens mount frame 20, the present invention is not restricted thereto. As shown in FIG. 6 for example, lens positioning sections 130 and 131 may be provided at the outer peripheral surface of the lens mount frame 20. A frame 137 provided on the side surface of the lens 12 is fitted over the outer peripheral surface of the lens mount frame 20.

Third Embodiment

Figure 7A:
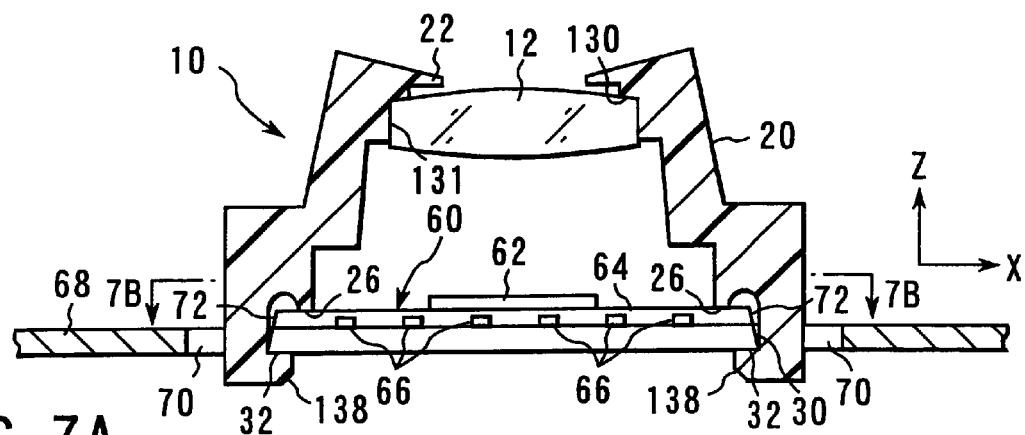
FIG. 7A is a vertical cross-sectional view showing an image taking lens unit according to a third embodiment of the present invention.
Figure 7B:
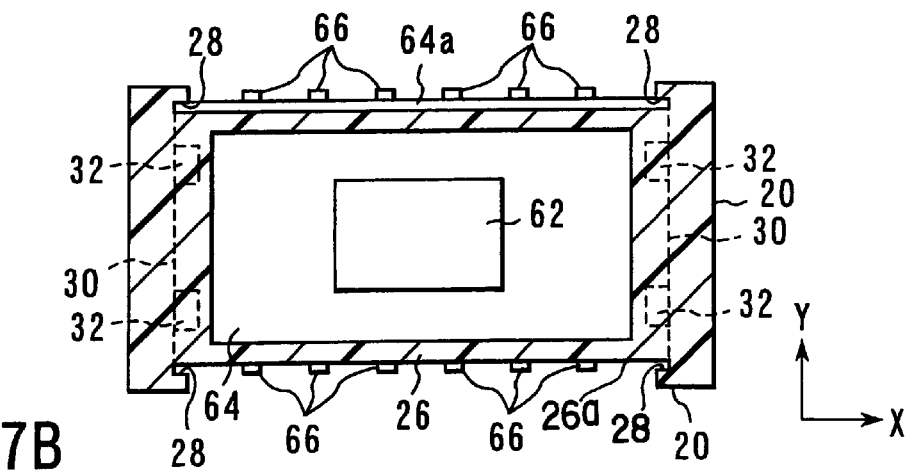
FIG. 7B is a horizontal cross-sectional view, as taken along line 7B—7B in FIG. 7A, showing the image taking lens units.

With reference to FIGS. 7A and 7B, an explanation will be made about an image taking lens unit according to a third embodiment of the present invention. In these Figures, those members indicated by the same reference numerals as those in the first and second embodiments show corresponding members and any detailed explanation is, therefore, omitted to avoid duplication.

As shown in FIGS. 7A and 7B, the image taking lens unit 10 has a lens 12, a lens mount frame 20 for retaining the lens and an image pickup element mounting substrate 60.

The lens mount frame 20 has lens positioning face for positioning the lens 12, that is, a vertically lens positioning section 130 and a horizontally lens positioning section 131. The lens 12 is fixed to the lens positioning face by a bonding or pressing operation.

The lens mount frame 20 has, in addition to a section for defining the vertically lens positioning section 130, a "stop" section 22 extending toward the front of the lens 12.

The image pickup element mounting substrate 60 has an image pick-up element mounting chip 62, a rectangular support substrate 64 for supporting the chip and a plurality of terminals 66. These terminals 66 are arranged at one pair of opposite surfaces of a rectangular support substrate 64.

The image pick-up mounting substrate 60 is provided on a circuit board 68 and the terminals 66 are electrically connected to connection wires included in the circuit board 68. The lens mount frame 20 has two pairs of, that is, four projections having an engaging portion 32 and fitted in holes 70. The image pick-up element mounting substrate 60 and circuit board 68 have a tapered portion 72 to allow a readier insertion of the engaging portions into the holes 70.

Further, each of the projections having the engaging portion 32 has a tapered portion 138 for the substrate as in the case of FIG. 1A. In order to ensure a readier insertion of the support substrate 64 along the tapered portion 138 for the substrate, the tapered portion 72 provided at the substrate is so shaped as to be inclined from an inner side toward an outside as in the case of the tapered portion 138 for the substrate.

The projections having the engaging portion 32 are made of elastic members so as to be easily bent. As a result, the projections having the engaging portion 32 are outwardly bent with a progress of its insertion into the hole 70 in such a manner to have its tapered portion 138 for the substrate 138 pushed by the tapered portion 72 and outwardly spread apart and, after it has been passed through the hole 70, the projections are elastically returned back to its original posture. As a result, as indicated in FIG. 7A, the lens mount frame 20 is fitted in the hole, by one operation, without using any bonding agent and mounted on the circuit board 68 to prevent the frame from falling off the circuit board.

The circuit board 68 is fixed to a housing, etc., of a device such as a camera and hence the image taking lens unit 10 is supported by the circuit board 68 in the device.

The lens mount frame 20 further has substrate positioning face for positioning the image pick-up element mounting substrate 60. The substrate positioning face is constituted by a portion of the inner wall surface of the lens mount frame 20. The substrate positioning face has a vertically substrate positioning section for determining the vertical position of the image pickup element mounting substrate 60 and a horizontally substrate positioning section for determining the horizontal position of the image pickup element mounting substrate 60. The vertically substrate positioning section has a z direction substrate positioning portion 26 for determining the position of the image pickup element mounting substrate 60 in the z direction in FIG. 7A. The horizontally substrate positioning section has one pair of x direction substrate positioning portions 30 for determining the position of the image pickup element mounting substrate 60 in the x direction and two pairs of y direction substrate positioning portions for determining the image pickup element mounting substrate 60 in the y direction in FIG. 7B.

Since the engaging portions 32 have elasticity also in the vertical direction, the image pick-up element mounting substrate 60 is pressed against the z direction positioning portion 26 to position it in the z direction. That is, the distance between the lens 12 and the image pick-up element chip 62 is automatically set to a desired designed value by the above-mentioned pressing operation. The image pick-up element mounting substrate 60 is positioned in the y direction by being pressed against the y direction positioning portions 28.

Further, the image pick-up element mounting substrate 60 is positioned in the x direction by being pressed against the x direction positioning portions 30.

Since, in this way, the image pick-up element mounting substrate 60 is pressed against the y direction positioning portions 28 and x direction positioning portions 30, the position of the image pick-up element chip 62 in the direction perpendicular to the axis of the lens 12, that is, in the horizontal direction is automatically adjusted and, normally, its center is set on the axis of the lens 12.

Although the lens mount frame 20 is fixed on the circuit board 68 by holding the image pick-up element mounting substrate 60 and circuit board 68 between the engaging portions 32 and the x direction positioning portion 26, more preferably a bonding agent is used to prevent a movement of the lens mount frame with respect to the circuit board 68.

The image taking lens unit 10 according to the present embodiment can be made less in component parts, simpler in shape and more compact and, further, position adjustment among the optical component parts can be completed simply by positioning the image pick-up element mounting substrate 60 onto the lens mount frame 20 and the manufacturing cost involved can be suppressed to a lower level. By simply inserting the engaging portions 32 into the hole 70 of the circuit board 68, the lens mount frame 20 is mounted on the circuit board 68 and excellent assembly can be achieved. This contributes to the lowering of a manufacturing cost involved.

Fourth Embodiment

Figure 8A:
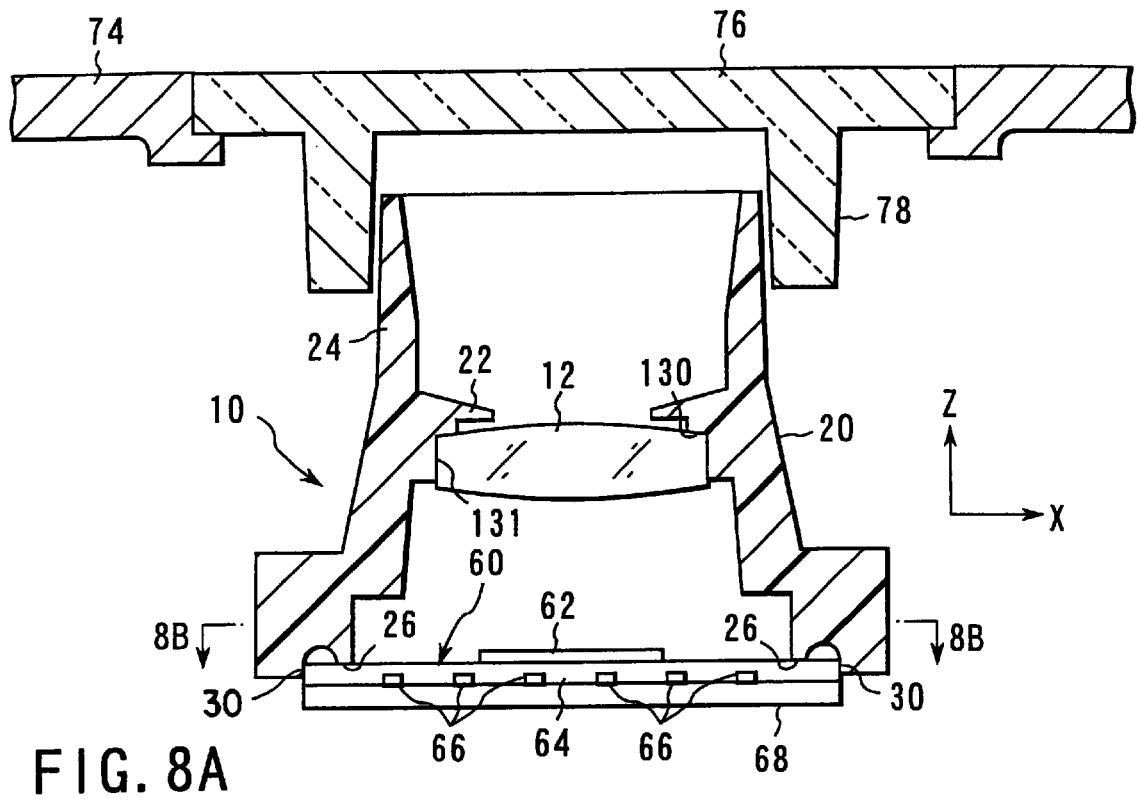
FIG. 8A is a vertical cross-sectional view showing an image taking lens unit according to a fourth embodiment of the present invention.
Figure 8B:
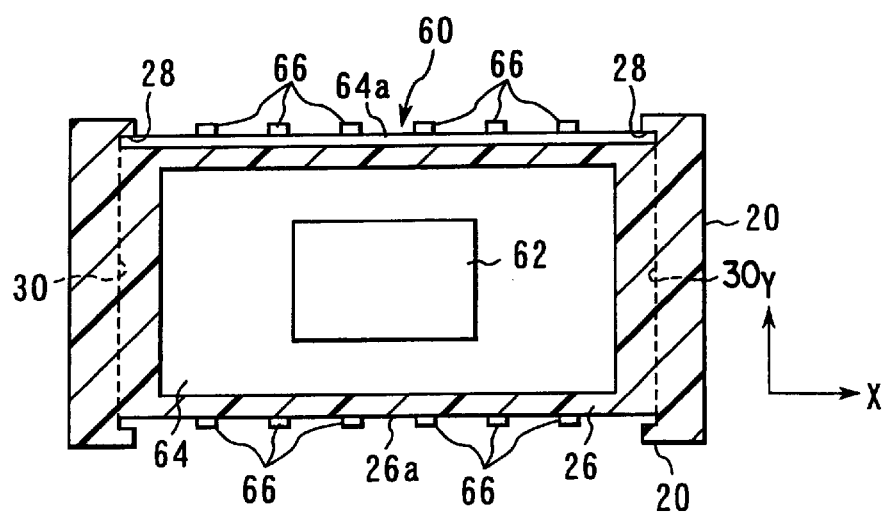
FIG. 8B is a horizontal cross-sectional view, taken along line 8B—8B in FIG. 8A, showing the image taking lens unit.

With reference to FIGS. 8A and 8B an explanation will be made about an image taking lens unit according to the fourth embodiment of the present embodiment. In these Figures, those members indicated by the same reference numerals as those in the first to third embodiments show corresponding members and any detailed explanation is, therefore, omitted to avoid duplication.

As indicated as shown in FIGS. 8A and 8B, an image taking lens unit 10 has a lens 12, a lens mount frame 20 for holding the lens and an image pick-up element mounting substrate 60.

The lens mount frame 20 has lens positioning face for positioning the lens 12, that is, a vertically lens positioning section 130 and a horizontally lens positioning section. The lens 12 is fixed to the lens positioning face by a bonding or a pressing operation.

The lens mount frame 20 has, in addition to a portion defining the vertically lens positioning section 130, a "stop" section extending toward the front of the lens 12.

The image pickup element mounting substrate 60 has an image pick-up element chip 62, a rectangular support substrate 60 for supporting the chip and a plurality of terminals 66. These terminals are arranged at one pair of opposite side faces of the rectangular support substrate 64.

The lens mount frame 20 has substrate positioning face for positioning the image pick-up element mounting substrate 60. The substrate positioning face is constituted by a portion of the inner wall surface of the lens mount frame 20. The substrate positioning face has a vertically substrate positioning section for determining the vertical position of the image pick-up element mounting substrate 60 and a horizontally substrate positioning section for determining the horizontal position of the image pick-up element mounting substrate 60. The vertically substrate mounting section has a z direction substrate positioning portion 26 for determining the position of the image pick-up element mounting substrate 60 in the z direction in FIG. 8A. The horizontally substrate positioning section has one pair of x direction substrate positioning portions 30 for determining the position of the image pick-up element mounting substrate 60 in the x direction in FIGS. 8A and 8B and two pairs of y direction positioning portions 28 for determining the position of the image pick-up element mounting substrate 60 in the y direction in FIG. 8B.

The image pick-up element mounting substrate 60 is positioned in the z direction by being pressed against z direction positioning portion 26. That is, the distance between the lens 12 and the image pick-up element chip 62 is automatically set to a desired designed value by the pressing operation.

The image pick-up element mounting substrate 60 is positioned in the y direction by being pressed against the y direction positioning portions 28. And the image pick-up element mounting substrate 60 is positioned in the x direction by being pressed against the x direction positioning portions 30.

By thus pressing the image pick-up element mounting substrate 60 against the y direction positioning portions 28 and x direction positioning portions 30, the position of the image pick-up element chip 62 in a direction perpendicular to the axis of the lens 12, that is, in the horizontal direction, is automatically adjusted and, normally, its center is set on the axis of the lens 12. After such positioning has been completed, the image pick-up element mounting substrate 60 is fixed to the lens mount frame 20.

The image pick-up element mounting substrate 60 is mounted on a circuit board 68 and the terminals 66 are electrically connected to connection wires included in the circuit board 68. The circuit board 68 is fixed to a housing, etc., and the image taking lens unit 10 is supported by the circuit board 68.

The lens mount frame 20 has a cylindrically extending portion 24 extending at the front of the lens 12. An exterior surface 74 has an optically transparent window section 76. The window section 76 has an inwardly extending cylindrical portion 78 and the inner diameter of the cylindrical portion 78 of the window section 76 is greater than the outer diameter of the extending portion 24 of the lens mirror frame 20 and the cylindrical portion 78 of the window section 76 is set around the extending portion 24 of the lens mount frame 20. The shape and arrangement of the cylindrical section 78 and extending portion 24 are such that the intrusion of dirt and dust, etc., into the extending portion 24 less occurs and that it contributes to preventing the lens 12 from being soiled.

The image taking lens unit 10 according to the present embodiment can be made less in component parts involved, much simpler in shape and smaller in size. Since position adjustment among the optical component parts are completed by positioning the image pick-up element mounting substrate 60 on the lens mount frame 20, it is possible to suppress the manufacturing cost to a lower level.

Fifth Embodiment

With reference to FIGS. 9A and 9B, an explanation will be made about an image taking lens unit according to a fifth embodiment. Those members indicated by the same reference numerals as those in the first to fourth embodiments show corresponding members and any detailed explanation is, therefore, omitted to avoid duplication.

As shown in FIGS. 9A and 9B, an image taking lens unit 10 has a lens 12, a lens mount frame 20 for retaining the lens and an image pick-up element mounting substrate 60.

The lens mount frame 20 has lens positioning face for positioning the lens 12, that is, a vertically lens positioning section 130 and a horizontally lens positioning section 131. The lens 12 is fixed to the lens positioning face by a bonding agent or a pressing operation.

The lens mount frame 20 has, in addition to the vertically lens positioning section 130, a "stop" section 22 extending toward a front of the lens 12.

As image pick-up element mounting substrate 60 has an image pick-up element chip 62, a rectangular support substrate 64 for supporting the chip and a plurality of terminals 66. These terminals 66 are arranged on one pair of opposite side faces of the rectangular support substrate 64.

The image pick-up element mounting substrate 60 further has an IR cut coating glass 80 arranged between the lens 12 and the image pick-up element chip 62. The IR cut coating glass 80 is fixed to the support substrate 64 through the glass rest 82. The chip 62 is sealed by the IR cut coating glass 80 and glass rest 82 and protected from an unwanted dirt and dust, etc.

The lens mount frame 20 has substrate positioning face for positioning the image pick-up element mounting substrate 60. The substrate positioning face is constituted by a portion of the inner wall surface of the lens mount frame 20. The substrate positioning face has a vertically substrate positioning section for determining the vertical position of the image pick-up element mounting substrate 60 and a horizontally substrate positioning section for determining the horizontal direction of the image pick-up element mounting substrate 60. The vertically substrate positioning section has a z direction substrate positioning portion 26 for determining the position of the substrate 60 in the z direction in FIG. 9A. The horizontally substrate positioning section has one pair of x direction substrate positioning portions 30 for determining the position of the image pick-up element mounting substrate 60 in the x direction in FIGS. 9A and 9B and two pairs of y direction substrate positioning portions 28 for determining the position of the substrate 60 in the y direction in FIG. 9B.

The image pick-up element mounting substrate 60 is positioned in the z direction by being pressed against z direction positioning portion 26. That is, by such a pressing operation, a distance between the lens 12 and the image pick-up element chip 62 is set to a desired designed value.

The image pick-up element mounting substrate 60 is positioned in the y direction by being pressed against the y direction positioning portions 28. The substrate 60 is positioned in the x direction by being pressed against x direction positioning portions 30.

By thus pressing the substrate 60 against the y direction positioning portions 28 and x direction positioning portions 30, the position of the image pick-up element chip 62 in the direction perpendicular to the axis of the lens 12, that is, in the horizontal direction is automatically adjusted and, usually, its center is set on the axis of the lens 12. After the positioning has been completed, the substrate 60 is fixed to the lens mount frame 20 by a bonding.

The image taking lens unit 10 according to the present embodiment can be made less in component parts, much simpler in shape and compact. Since position adjustment among the optical component parts is completed simply by positioning the substrate 60 on the lens mount frame 20, the manufacturing cost is suppressed to a lower level. Since the IR cut coating glass 80, which is fixed to the support substrate 64 through the glass rest 82, occupies a useless inner space in the lens mount frame 20, such that the unit needs not to be large.

Sixth Embodiment

With reference to FIGS. 10A and 10B, an explanation will be made about an image taking lens unit according to a sixth embodiment. In these Figures, those members indicated by the same reference numerals as those in the first to fifth embodiments show corresponding members and any detailed explanation is, therefore, omitted to avoid duplication.

As shown in FIGS. 10A and 10B, the image taking lens unit 10 has a lens 12, a lens mount frame 20 for retaining the lens 12 and an image pick-up element mounting substrate 60.

The lens mount frame 20 has lens positioning face positioning the lens 12, that is, a vertically lens positioning section 130 and a horizontally lens positioning section 131. The lens 12 is fixed to the lens positioning face by a bonding or a pressing operation.

The lens mount frame 20 has, in addition to a section for defining the vertically lens positioning section 130, a "stop" section 22 extending toward a front of the lens 12.

The image pick-up element mounting substrate 60 has an image pick-up element chip 62, a rectangular support substrate 64 for supporting the chip and a plurality of terminals 66. These terminals 66 are arranged at one pair of opposite side faces of the rectangular support substrate 64.

The substrate 60 further has an IR cut coating glass 80 arranged between the lens 12 and the image pick-up element chip 62. The IR cut coating glass 80 is fixed to the support substrate 64 through a glass rest 82. The image pick-up element chip 62 is sealed by the IR cut coating glass 80 and the glass rest 82 and protected from any unwanted dirt and dust, etc.

The image pick-up element mounting substrate 60 is mounted on a circuit board 68 and the terminals 66 are electrically connected to connection wires included in the circuit board 68. The lens mount frame 20 has two pairs of, that is, four projections having engaging portion 32 and these are fitted into holes 70 in the circuit board 68. The image pick-up element mounting substrate 60 and circuit board 68 have tapered portions 72 for allowing a ready insertion of the engaging portions 32 into the holes 70.

Further, each of the projections having the engaging portion has a tapered portion 138 for the substrate as in the case of FIG. 1A. The lens mount fame 20 has elasticity at the peripheral portions of the engaging portions 32. The engaging portions 32 are outwardly spread apart in its insertion into the holes 70 and, after being passed through the holes 70, are returned back to an original state. As a result, the lens mount frame 20 is mounted such that it never falls off the circuit board 68.

The lens mount unit 20 has substrate positioning face for positioning the image pick-up element mounting substrate 60. The substrate positioning face is constituted by a portion of the inner wall surface of the lens mount frame 20. The substrate positioning face has a vertically substrate positioning section for determining the vertical position of the image pick-up element mounting substrate 60 and a horizontally substrate positioning section for determining the horizontal position of the image pick-up element mounting substrate 60. The vertically substrate positioning section has a z direction substrate positioning portion 26 for determining the position of the image pick-up element mounting substrate 60 in the z direction in FIG. 10A. The horizontally substrate positioning section has one pair of x direction substrate positioning portions 30 for determining the position of the substrate 60 in the x direction in FIGS. 10A and 10B and two pairs of y direction substrate positioning portions 28 for determining the position of the substrate 60 in the y direction in FIG. 10B.

Since the engaging portions 32 have elasticity even in the vertical direction, the substrate 60 is positioned in the z direction by being pressed against the z direction positioning portion 26. That is, by such a pressing operation, a distance between the lens 12 and the image pick-up element chip 62 is automatically set to a desired designed value.

The image pick-up element mounting substrate 60 is positioned in the y direction by being pressed against the y direction positioning portions 28. Further, the image pick-up element mounting substrate 60 is positioned in the x direction by being pressed against the x direction positioning portions 30.

By, in this way, pressing the image pick-up element mounting substrate 60 against the y direction positioning portions 28 and x direction positioning portions 30, the position of the image pick-up element chip 62 in a direction perpendicular to the axis of the lens 12, that is, in the horizontal direction is automatically adjusted and, normally, its center is set on the axis of the lens 12.

The lens mount frame 20 is fixed to the circuit board 68 by sandwiching the substrate 60 and circuit board 68 between the engaging portions 32 and the z direction positioning portion 26 and, more preferably, bonding is achieved there so as to prevent a movement of the lens mount frame with respect to the circuit board 68.

The image taking lens unit 10 according to the present invention can be made less in the number of component parts, much simpler in shape and more compact and, since position adjustment among the optical component parts is completed simply by positioning the substrate 60 onto the lens mount frame 20, the manufacturing cost is suppressed to a lower level. Further, the lens mount frame 20 is mounted on the circuit board 68 simply by inserting the engaging portions 32 into the holes 70 of the circuit board 68. Thus an excellent assembly is ensured and this contributes to the lowering of the manufacturing cost involved. Since the IR cut coating glass 80, which is fixed to the support substrate 64 through the glass rest 82, occupies in an useless inner space in the lens mount frame 20, such that the unit needs not to be large.

Seventh Embodiment

Figure 11A:
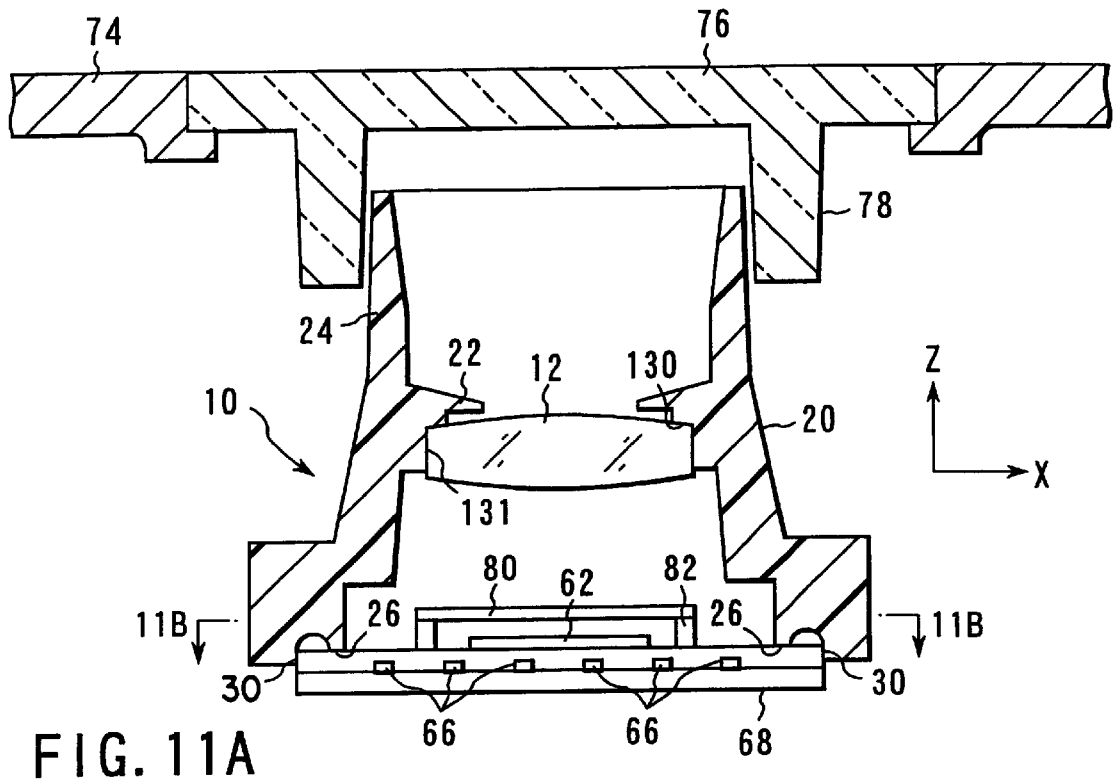
FIG. 11A is a vertical cross-sectional view showing an image taking lens unit according to a seventh embodiment of the present invention.
Figure 11B:
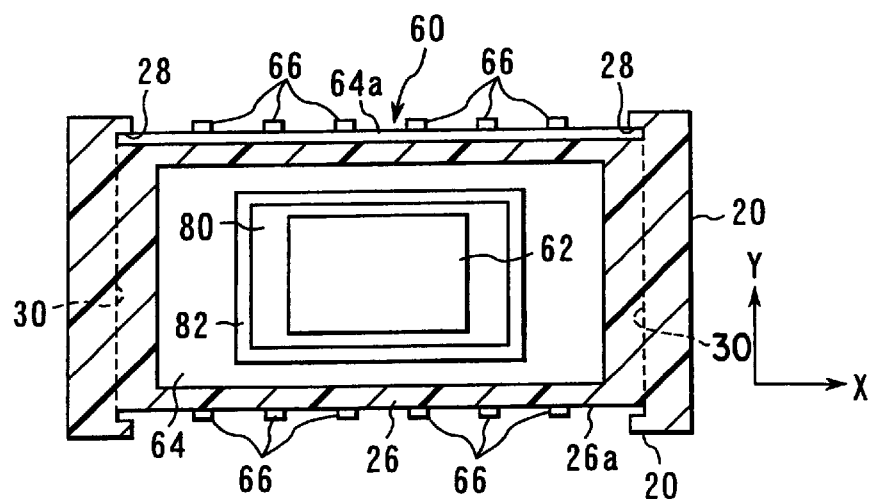
FIG. 11B is a horizontal cross-sectional view, as taken along line 11B—11B in FIG. 11A, showing the image taking lens unit.

With reference to FIGS. 11A and 11B, an explanation will be made about an image taking lens unit according to a seventh embodiment. In these Figures, those members indicated by the same reference numerals an those in the first to sixth embodiments show corresponding members and any detailed explanation is, therefore, omitted to avoid duplication.

As shown in FIGS. 11A and 11B, the image taking lens unit 10 has a lens 12, a lens mount frame 20 for retaining the lens and an image pick-up element mounting substrate 60. The lens mount frame 20 has lens positioning face for positioning the lens 12, that is, a vertically lens positioning section 130 and a horizontally lens positioning section 131. The lens 12 is fixed to the lens positioning face by a bonding or a pressing operation.

The lens mount frame 20 has, in addition to a section for defining the vertically lens positioning section 130, a "stop" section 22 extending toward a front of the lens 12.

The image pick-up element mounting substrate 60 has an image pick-up element chip 62, a rectangular support substrate 64 for supporting the chip and a plurality of terminals 66. These terminals 66 are arranged at one pair of opposite side faces of the rectangular support substrate 64.

The substrate 60 further has an IR cut coating glass 80 arranged between the lens 12 and the image pick-up element chip 62. The IR cut coating glass 80 is fixed to the support substrate 64 through a glass rest 82. The chip 62 is sealed by the IR cut coating glass 80 and glass rest 82 and protected from an unwanted dirt and dust, etc.

The lens mount frame 20 further has substrate positioning face for positioning the substrate 60. The substrate positioning face is constituted by a portion of the inner wall surface of the lens mount frame 20. The substrate positioning face has a vertically substrate positioning section for determining the vertical position of the substrate 60 and a horizontally substrate positioning section for determining the horizontal position of the substrate 60. The vertically substrate positioning section has a z direction substrate positioning portion 26 for determining the position of the substrate 60 in the z direction in FIG. 11A. The horizontally substrate positioning section has one pair of x direction substrate positioning portions 30 for determining the position of the substrate 60 in the x direction in FIGS. 11A and 11B and two pairs of y direction substrate positioning portions 28 for determining the position of the substrate in the y direction in FIG. 11A.

The substrate 60 is positioned in the z direction by being pressed against a z direction positioning portion 26. That is, by such a pressing operation, the distance between the lens 12 and the image pick-up element chip 62 is automatically set to a desired designed value.

The substrate 60 is positioned in the y direction by being pressed against a y direction positioning portions 28. And the substrate 60 is positioned in the x direction by being pressed against the x direction positioning portions 30.

By, in this way, pressing the substrate 30 against the y direction positioning portions 28 and x direction positioning portions 30, the position of the chip 62 in a direction perpendicular to the axis of the lens 12, that is, in the horizontal direction, is automatically adjusted and, normally, its center is set on the axis of the lens 12. After the positioning is completed, the substrate 60 is fixed to the lens mount frame 20 by a bonding.

The substrate 60 is mounted on a circuit board 68 and terminals 66 are electrically connected to connection wires included in the circuit board 68. The circuit board 68 is fixed to a housing, etc., and the image taking lens unit 10 is supported by the circuit board 68.

The lens mount frame 20 has a cylindrically extending portion 24 extending at the front of the lens 12. An optically transparent window section 76 is provided in an exterior surface 74 and has an inwardly extending cylindrical portion 78. The inner diameter of the cylindrical portion 78 of the window section 76 is greater than the outer diameter of the extending portion 24 of the lens mount frame 24 and the cylindrical portion 78 of the window section 76 is located around the extending portion 24 of the lens mount frame 20. The shape and arrangement of the cylindrical portion 78 and extending portion 24 ensure less intrusion of dirt and dust, etc., into the inner side of the extending portion 24 and contribute to preventing the lens 12 from being soiled.

The image taking lens unit according to the present embodiment can be made less in the number of component parts, much simpler in shape and more compact in size and, since position adjustment among the optical component parts is completed simply by positioning the substrate 60 onto the lens mount frame 20, the manufacturing cost can be suppressed to a lower level. The IR cut coating glass 80 is fixed to the support substrate through the glass rest 82 and, since this is so done by utilizing an extra space within the lens mount frame 20, a resultant unit never becomes bulkier in size.

Eighth Embodiment

Figure 12A:
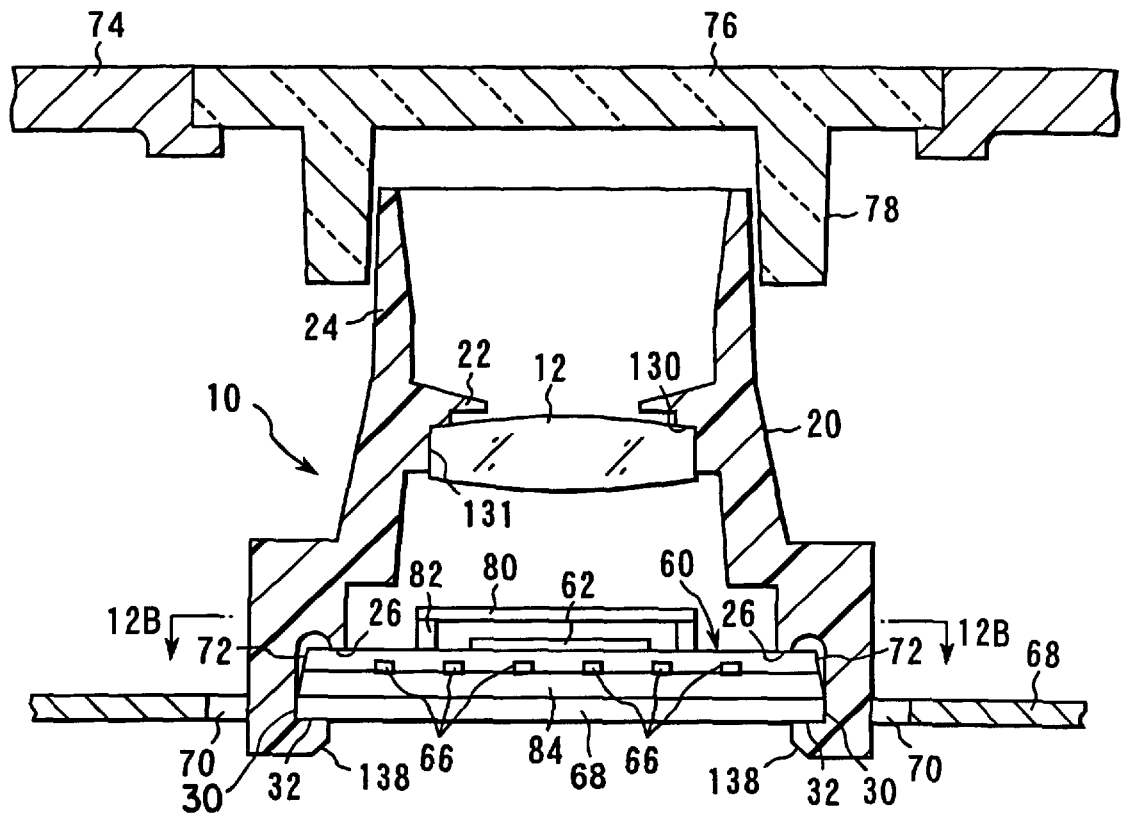
FIG. 12A is a vertical cross-sectional view showing an image taking lens unit according to an eighth embodiment of the present invention.
Figure 12B:
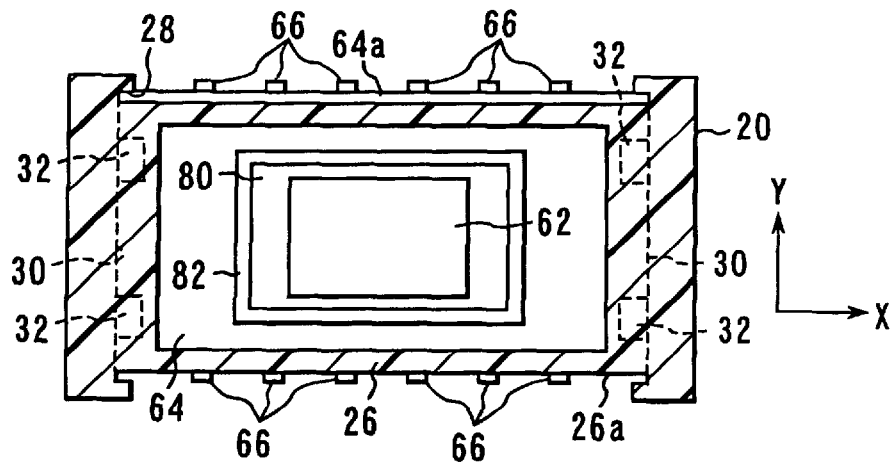
FIG. 12B is a horizontal cross-sectional view, as taken a long line 12B—12B in FIG. 12A, showing the image taking lens unit.

With reference to FIGS. 12A and 12B an explanation will be made about an image taking lens unit according to an eighth embodiment. In these Figures, those members indicated by the same references as those in the first to seventh embodiments show corresponding members and any detailed explanation is, therefore, omitted to avoid duplication.

As shown in FIGS. 12A and 12B, the image taking lens unit 10 has a lens unit 12, a lens mount unit 20 for retaining the lens and an image pick-up element mounting substrate 60.

The lens mount frame 20 has lens positioning face for positioning the lens 12, that is, a vertically lens positioning section 130 and a horizontally lens positioning section 131. The lens 12 is fixed to the lens positioning face by a bonding or pressing operation.

The lens mount frame 20 has, in addition to a section defining the vertically lens positioning section, a "stop" section 22 extending toward a front of the lens 12. The image pick-up element mounting substrate 60 has an image pick-up element chip 62, a rectangular support substrate 64 for supporting the chip 62 and a plurality of terminals 66. These terminals 66 are positioned on one pair of opposite side faces of the rectangular support substrate 64.

The substrate 60 has an IR cut coating glass 80 arranged between the lens 12 and the chip 62. The IR cut coating glass 80 is fixed to the support substrate 64 through a glass rest 82. The chip 62 is sealed by the IR cut coating glass 80 and glass rest 82 and protected from an unwanted dirt and dust, etc.

The image pick-up element mounting substrate 60 is mounted to a circuit board 68 through a support substrate 84 and the terminals 66 are electrically connected to connection wires included in the circuit board 68. The lens mount frame 20 has two pairs of, that is, four projections having engaging portions 32 and the projections are fitted in holes 70 in the circuit board 68. The substrate 60 and circuit board 68 have a tapered section 72 to allow a readier insertion of the engaging portions 32 into the holes 70.

Further, each of the projections having the engaging portion 32 has a tapered portion 138 as in the case of FIG. 1A. The lens mount frame 20 has an elasticity at the peripheral portion of the engaging portions 32, and the engaging portions 32 are outwardly spread apart in their insertion into the holes 70 and, after being passed through the holes, returned back to their original shape as shown in FIG. 12A. As a result, the lens mount frame 20 is mounted on the circuit board 68 such that it never falls off the circuit board 68. The circuit board 68 is fixed to a housing, etc., and, 12 and the chip 62 is automatically set to a desired designed value.

The substrate 60 is positioned in the y direction by being pressed against the y direction positioning portions 28. Further, the substrate 60 is positioned in the x direction by being pressed against the x direction positioning portions 30.

By, in this way, pressing the substrate 60 against the y direction positioning portions 28 and x direction positioning portions 30, the position of the chip 62 in a direction perpendicular to the axis of the lens 12, that is, in the horizontal direction, is automatically adjusted and, normally, its center is set on the axis of the lens 12.

The lens mount frame 20 is fixed to the circuit board 68 by holding the substrate 60, support substrate 84 and circuit board between the engaging portions 32 and the z direction positioning portion 26 and, more preferably, a bonding is made there so as to prevent a movement of the lens mount frame with respect to the circuit board 68.

The image taking lens unit 10 according to the present embodiment is made less in the number of component parts involved, simpler in shape and more compact and, since positional adjustment among the optical component parts is completed simply by positioning the substrate 60 onto the lens mount frame hence, the image taking lens unit 10 is supported by the circuit board 68.

The lens mount unit 20 further has substrate positioning face for positioning the image pick-up element mounting substrate 60. The substrate positioning face is constituted by a portion of the inner wall surface of the lens mount frame 20. The substrate positioning face has a vertically substrate positioning section for determining the vertical position of the substrate 60 and a horizontally substrate positioning section for determining the horizontal position of the substrate 60. The vertically substrate positioning section has a z direction substrate positioning portion 26 for determining the position of the substrate 60 in the z direction in the Figures. The horizontally substrate positioning section has one pair of x direction substrate positioning portions 30 for determining the position of the substrate 60 in the x direction in the Figures and two pairs of y direction substrate positioning portions 28 for determining the position of the substrate 60 in the y direction in the Figures.

Since the engaging portions 32 have elasticity even in the vertical direction, the substrate 60 is positioned in the z direction by being pressed against the z direction positioning portion 26. That is, by the pressing operation, the distance between the lens 20, the manufacturing cost is suppressed to a lower level. The lens mount frame 20 is mounted on the circuit board 66 simply by inserting the engaging portions 32 into the holes 70 of the circuit board 68 and an excellent assembly is ensured and this contributes to a lowering in the manufacturing cost involved. The IR cut coating glass 80 is fixed to the support substrate 64 through the glass rest 82 and, since this structure is provided by utilizing an extra space within the lens mount frame 20, a resultant structure never becomes bulkier.

Ninth Embodiment

Figure 13:
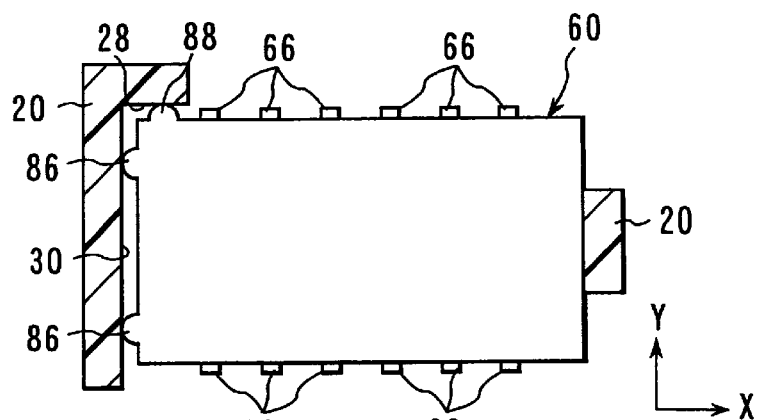
FIG. 13 is a horizontal cross-sectional view showing an image taking lens unit according to a ninth embodiment of the present invention.
Figure 14:
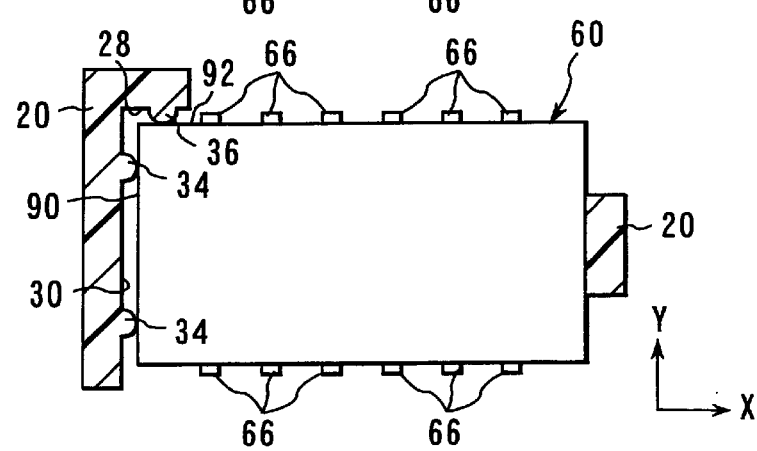
FIG. 14 is a horizontal cross-sectional view showing another image taking lens unit according to the ninth embodiment of the present invention.

With reference to FIGS. 13 and 14, an explanation will be made about an image taking lens unit according to a ninth embodiment and, in particular, a positioning structure for positioning an image pick-up element mounting substrate 60 with respect to a lens mount frame 20. FIG. 13 shows one practical example of the present invention and FIG. 14 shows another practical examples are based on the same technical concept. In these Figures, those members indicated by the same reference numerals as those in the above-mentioned embodiments show corresponding members and any detailed explanation is, therefore, omitted.

In FIG. 13, an image taking element mounting substrate 60 has one pair of projections 86 on one of a pair of opposite side faces having no terminals and one projection 88 on one of a pair of opposite side faces having terminals 66. Positioning of the substrate 60 in an x direction is made by pressing the two projections against the x direction positioning portion 30 of the lens mount frame 20 and positioning of the substrate 60 in the y direction is made by pressing the projection 88 against the y direction positioning portion 28 of the lens mount frame 20.

The substrate 60 makes point contact with the x direction positioning portion 30 of the substrate 60 owing to the presence of the projections 86 and makes point contact with the y direction positioning portion 28 owing to the presence of the projection 88. That is, positioning accuracy is determined by the manufacturing accuracy between the projections 86 and the x direction positioning portion 30 and that between the projection 88 and the y direction positioning portion 28. In particular, since the projections 86 and 88 of the substrate 60 needs only to have high accuracy, the manufacturing restriction is more lenient. It is, therefore, possible to suppress the manufacturing cost to a lower level.

In FIG. 14, the lens mount frame 20 has two projections 34 with respect to one of a pair of terminal-absent opposite side faces 90 of the substrate 60 and one projection 36 with respect to one of the other pair of terminal-present opposite side faces 92 of the substrate. That is, the x direction positioning portion 30 of the lens mount frame 20 has the two projections 34 and the y direction positioning portion 28 of the lens mount frame 20 has the one projection 36. Positioning of the substrate 60 in the x direction is made by pressing the side face 90 against the two projections 34 and positioning of the substrate 60 in the y direction is made by pressing the side face 92 of the substrate 60 against the projection 36.

The substrate 60 makes point contact with the lens mount frame 20 due to the presence of the projections 34 and 36. Therefore, positioning accuracy is determined by the manufacturing accuracy between the projections 34 and the side face 90 and that between the projection 36 and the side face 92. Since, in particular, the lens mount frame 20 needs only to have a high accuracy at the projections 34 and 36, the manufacturing restriction is more lenient and the manufacturing cost can be suppressed to a lower level.

Tenth Embodiment

Figure 15A:
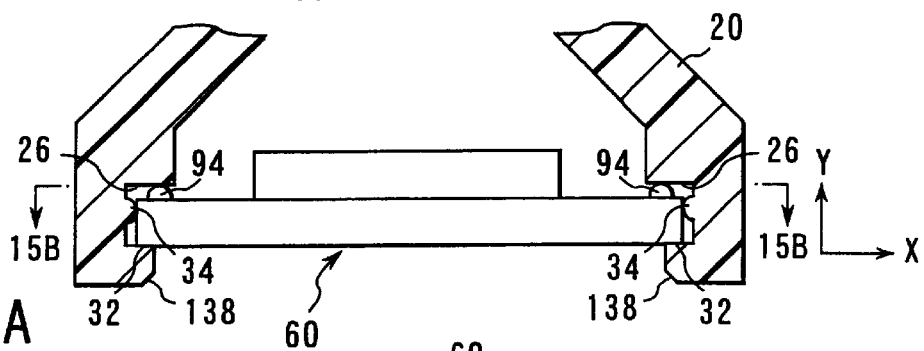
FIG. 15A is a partial, vertical cross-sectional view showing an image taking lens unit according to a tenth embodiment of the present invention.
Figure 15B:
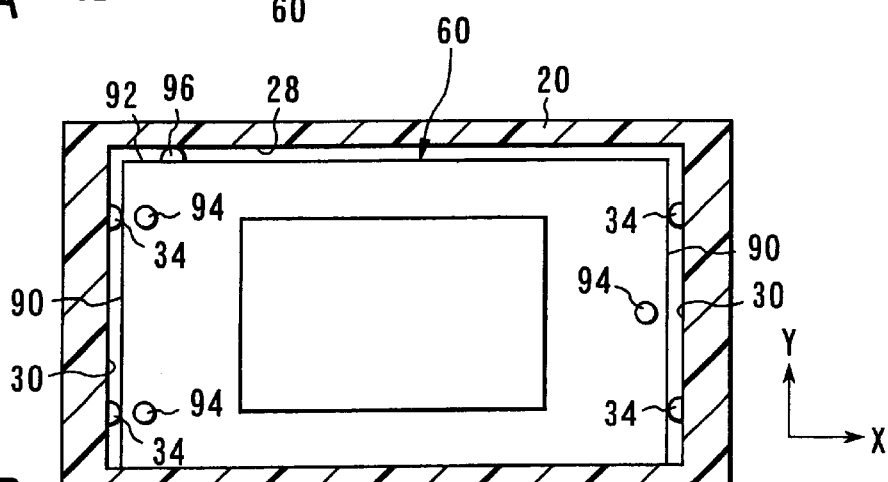
FIG. 15B is a horizontal cross-sectional view, as taken along line 15B—15B in FIG. 15A, showing the image taking lens unit.

With reference to FIGS. 15A, 15B, and 16A and 16B an explanation will be made about a positioning structure for positioning an image taking lens unit according to a tenth embodiment, in particular, for positioning an image pick-up element mounting substrate 60 with respect to a lens mount frame 20. FIGS. 15A and 15B show one example of the present embodiment and FIGS. 16A and 16B another example of the present embodiment. Both the examples are based on the same technical concept. In the Figures, those members indicated by the same reference numerals as those in the above-mentioned embodiments show corresponding members and any detailed explanation is, therefore, omitted.

In FIGS. 15A and 15B, a substrate 60 has, on its upper surface, three projections 94 provided opposite to z direction positioning portion 26 of a lens mount frame 20. Positioning of the image pick-up element mounting substrate 60 in the z direction is made by pressing the three projections 94 against the z direction positioning portion 26 of the lens mount frame 20.

Further, the lens mount frame 20 has projections 34 on inner wall sides of elastically deformable engaging portions 32. That is, one pair of z direction positioning portions 30 of the lens mount frame 20 have two projections each. Positioning of the substrate 60 in an x direction is made by pressing the pair of electrode-absent opposite side faces 90 of the substrate 60 against the projections 34 of elastically deformable engaging portions 32.

The substrate 60 has a projection 96 at one of one pair of opposite side faces 92 having terminals 66. Positioning of the substrate 60 in the y direction is made by pressing the projection 96 against a y direction positioning portions 28 of the lens mount frame 20.

The substrate 60 makes point contact with the lens mount frame 20 due to the presence of the contacts 94, 96 and 34. Thus, positioning accuracy is determined by the manufacturing accuracy between the projections 94 and the z direction positioning portion 26, that between the projection 96 and the y direction positioning portions 28 and that between the projections 34 and the face 90. Since the projections 34, 94 and 96 need only to have a high dimensional accuracy, the manufacturing restriction is more lenient and the manufacturing cost can be suppressed to a lower level.

Figure 16A:
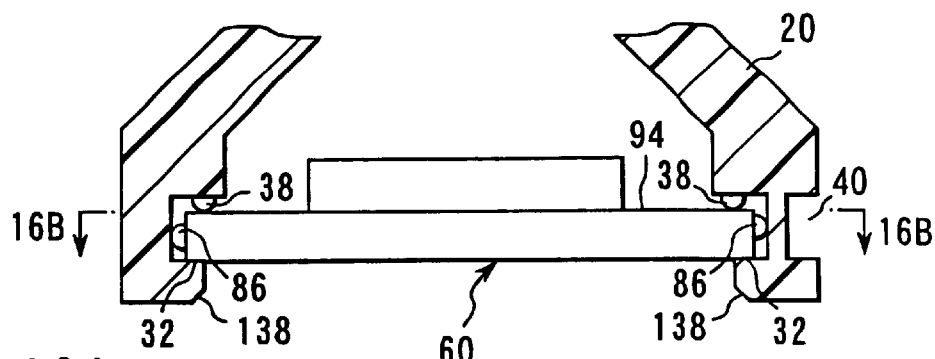
FIG. 16A is a partial, vertical cross-sectional view showing another image taking lens unit according to the tenth embodiment of the present invention.
Figure 16B:
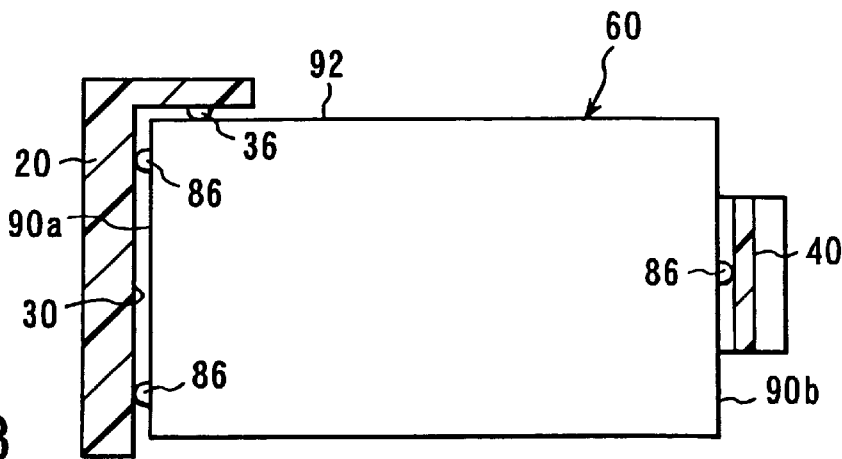
FIG. 16B is a horizontal cross-sectional view as taken along line 16B—16B in FIG. 16A, showing the image taking lens unit.

In FIGS. 16A and 16B, a lens mount frame 20 has a plurality of elastically deformable engaging portions 32 retaining an image pick-up element mounting substrate 60. Further, the lens mount frame 20 has a plurality of projections 38 facing an upper surface 94 of the substrate 60. That is, the z direction positioning portion 26 of the lens mount frame 20 has a plurality of projections 38. The substrate 60 is positioned in the z direction of the substrate 60 by pressing its upper surface 94 against the projections 38.

The lens mount frame 20 has one projection 36 facing one of a pair of opposite side faces 92 having terminals 66 of the substrate 60. That is, a y direction positioning portion 26 of the lens mount frame 20 has one projection 36. Positioning of the substrate 60 in the y direction is made by pressing the side face 92 of the substrate 60 against the projection 36.

The substrate 60 has three projections 86 at one pair of opposite side faces 90a, 90b having no electrodes. These three projections 86 are provided two on one side face 90a and one on the other side face 90b. Positioning of the substrate 60 in the x direction is made by pressing the projections 86 of the side face 90a against x direction positioning portions 30 of the lens mount frame 20.

One of the engaging portions 32 may have a thin wall 40. Since the lens mount frame 20 has the thin wall 40 at an area contacting with the projection 86 of the side face 90b to increase the elasticity, the engaging portion 32 having the thin wall 40 is more elastically deformable than the remaining latching section 32. As a result, the engaging portion 32 having the thin wall section 40 is elastically deformable to allow a readier assembly.

The substrate 60 makes point contact with the lens mount frame 20 due to the presence of the projections 36, 38 and 86. Thus, positioning accuracy is determined by the machining accuracy between the projection 36 and the side face 92, that between the projection 38 and the upper surface 94 and that between the projection 86 and the x direction positioning portions 30. Since high dimensional accuracy needs only to be achieved at the projections 36, 38 and 86, the machining accuracy is more lenient and the machining cost can be suppressed to a lower level. Further, the engaging portion 32 having the thin wall section 40 is easily elastically deformed to allow a readier assembly.

Eleventh Embodiment

Figure 17:
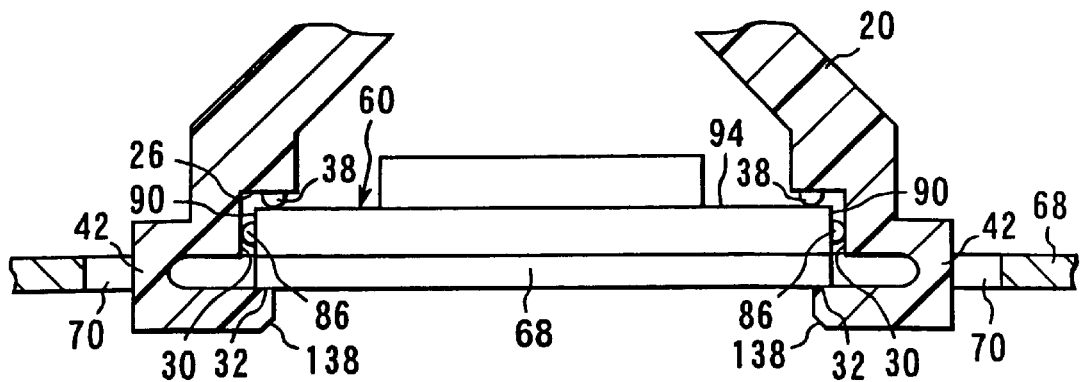
FIG. 17 is a partial, vertical cross-sectional view showing an image taking lens unit according to an eleventh embodiment of the present invention and a positioning structure for positioning an image pick-up element mounting substrate with respect to a lens mount frame.

With reference to FIG. 17, an explanation will be made about a positioning structure of positioning an image taking lens unit and, in particular, positioning an image pick-up element mounting substrate 60 with respect to a lens mount frame 20. In these Figures, members indicated by the same reference numerals as those in the above-mentioned embodiment show corresponding members and any detailed explanation is, therefore, omitted.

The substrate 60 is mounted on a circuit board 68 and the lens mount frame 20 has a plurality of engaging portions 32 and is fitted in holes 70. Each of the engaging portions 32 has a U-shaped section 42 to ensure a more positive vertical elasticity. The U-shaped section 42 increases the elasticity of the engaging portions 32. The engaging portions 32 are outwardly spread apart in their insertion into the holes 70 and, after being passed through the holes 70, returned back to an original shape as shown and retain the lens mount frame from falling off the circuit board 68.

The lens mount frame 20 has a plurality of projections 38 facing an upper surface 94 of the substrate 94. That is, z direction positioning portion 26 of the lens mount frame 20 have a plurality of projections 38. The substrate 60 is positioned in the z direction of the substrate 60 by pressing its upper surface 94 against the projections 38.

The substrate 60 has projections 86 at one pair of opposite side faces 90 having no electrodes. Positioning of the substrate 60 in the x direction is made by pressing the projections 86 against the x direction positioning portions 30 of the lens mount frame 20.

The positioning accuracy of the substrate 60 is determined by the manufacturing accuracy between the projection 38 and the upper surface 94 and that between the projection 86 and the x direction positioning portions 30. Since the projections 36, 38 and 86 need only to have high positioning accuracy, the manufacturing restriction is more lenient and the manufacturing cost can be suppressed to a lower level. Further, the engaging portions 32 has increased elasticity by the U-shaped section 42 and, hence, is elastically deformable. And a readier assembly is ensured.

Twelfth Embodiment

Figure 18:
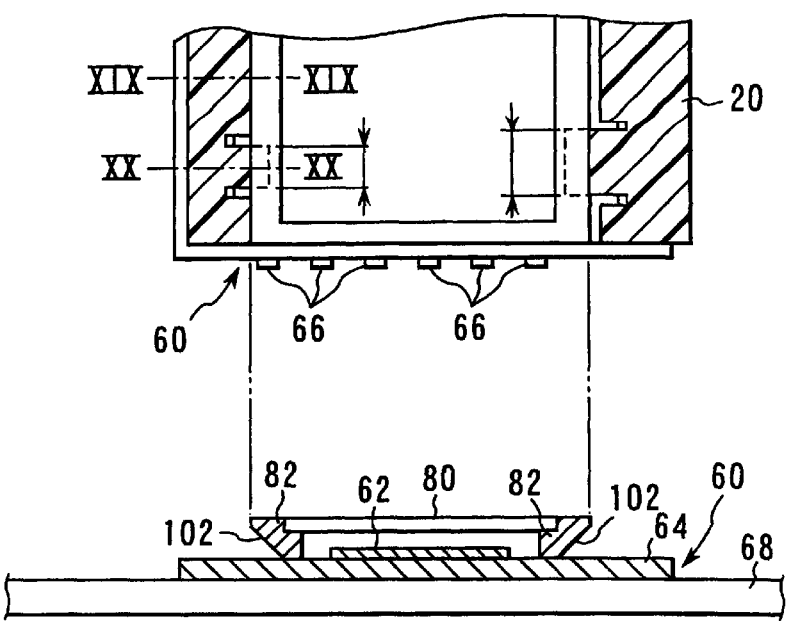
FIG. 18 is a partial vertical cross-sectional and partial horizontal cross-section showing an image taking lens unit according to a twelfth embodiment of the present invention.
Figure 19:
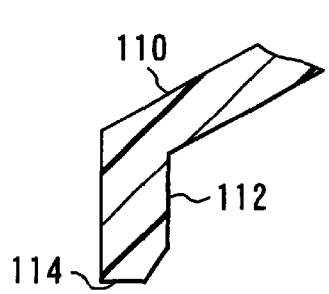
FIG. 19 is a cross-sectional view, as taken along line XIX—XIX in FIG. 18, showing a lens mount frame.
Figure 20:
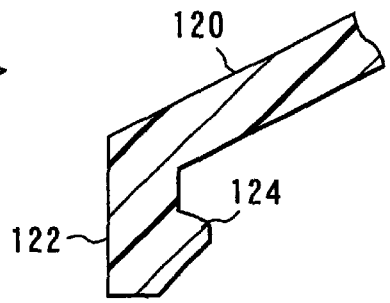
FIG. 20 is a cross-sectional view, as taken along line XX—XX in FIG. 18, showing the lens mount frame.
Figure 21:
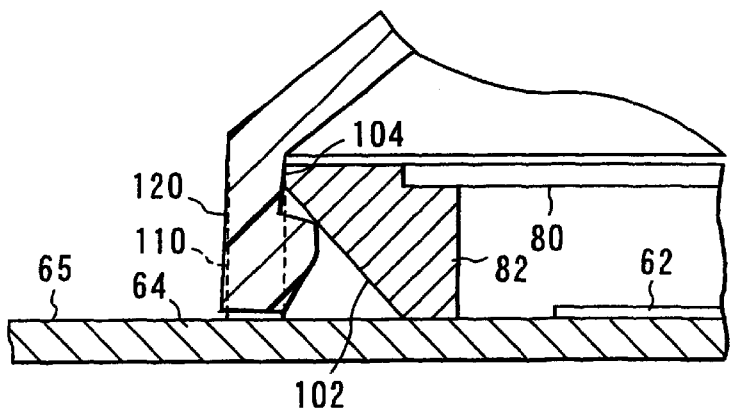
FIG. 21 is an enlarged, cross-sectional view, as taken along line XX—XX in FIG. 18, showing a lens mount frame and image pick-up element mounting substrate.

An image taking lens unit according to a twelfth embodiment shows an embodiment which can readily mount a lens mount frame on an image pick-up element mounting substrate 60 and can be so done without exerting any adverse effect on a circuit board 68. This explanation will be made with the use of FIGS. 18 to 21. FIG. 18 is a plan view and cross-sectional view, both partly in cross-section, showing the image taking lens unit. FIG. 19 shows a cross-section of the lens mount frame as taken on line XIX—XIX in FIG. 18, FIG. 20 is a cross-sectional view, as taken on line XX—XX in FIG. 18, showing the lens mount frame and FIG. 21 is an enlarged cross-sectional view, as taken on line XX—XX in FIG. 18, showing the lens mount frame an image pick-up element mounting substrate.

The image taking lens unit has a lens mount frame 20 for retaining a lens and an image pick-up element mounting substrate 60. The lens mount frame 20 is the same as any of the above-mentioned first to eighth embodiments except a mounting structure for mounting on the image pick-up element mounting substrate 60.

The substrate 60 has an image pick-up element chip 62, a rectangular support substrate 64 for supporting the chip and a plurality of terminals 66. The terminals 66 are arranged at one pair of opposite side faces of a rectangular support substrate 64.

The substrate 60 further has an IR cut coating glass 80 arranged between the lens 12 and the chip 62. The IR cut coating glass 80 is fixed to the support substrate 64 through a glass rest 82. The glass rest 82 has a tapered section 102.

The lens mount frame 20 has a positioning section 110 having a horizontally positioning face 112 and vertically positioning face 110 and a engaging section 120 having an elastic section 120 which can be elastically deformed. The elastic section 122 has a claw 124 abutting against a tapered section 102 of the glass rest 82.

The lens mount frame 20 is mounted to the substrate 60 with the glass rest 82 fitted therein. In the fitting of the lens mount frame 20 over the glass rest 82, the claws 124 of the engaging portions 120 are outwardly spread apart, of glass rest 82 and abut on the tapered portion 102. The lens lens mount frame 20 is thus firmly mounted on the substrate 60 and will never fall.

A width A1 of the left engaging portion 120 is set to be smaller than a width A2 of the right engaging portion 120 and a restoring force trying to return the engaging portions 120 back to their original shape is greater on the right side and, for this reason, the lens mount frame 20 fitted over the lens rest 82 is energized to the right direction.

The lens mount frame 20 is horizontally positioned by allowing the horizontally positioning face 112 of the positioning portion 110 to be abutted by an end face 104 of the glass rest 82 and vertically positioned by allowing the vertically positioning face 114 to be abutted by an upper surface 65 of the support substrate 64.

Since, in the image taking lens unit of the present invention, the lens mount frame 20 is fitted over the glass rest 82 for supporting the IR cut coating glass 80, the lens mount frame 20 can be made very compact. A much smaller image taking lens unit can be realized than those of the above-mentioned first to eighth embodiments.

The image taking lens unit of the above-mentioned invention can be used on various kinds of image taking devices using a CCD, C-MOS sensor, etc. Such practical examples will be explained below.

Figure 22:
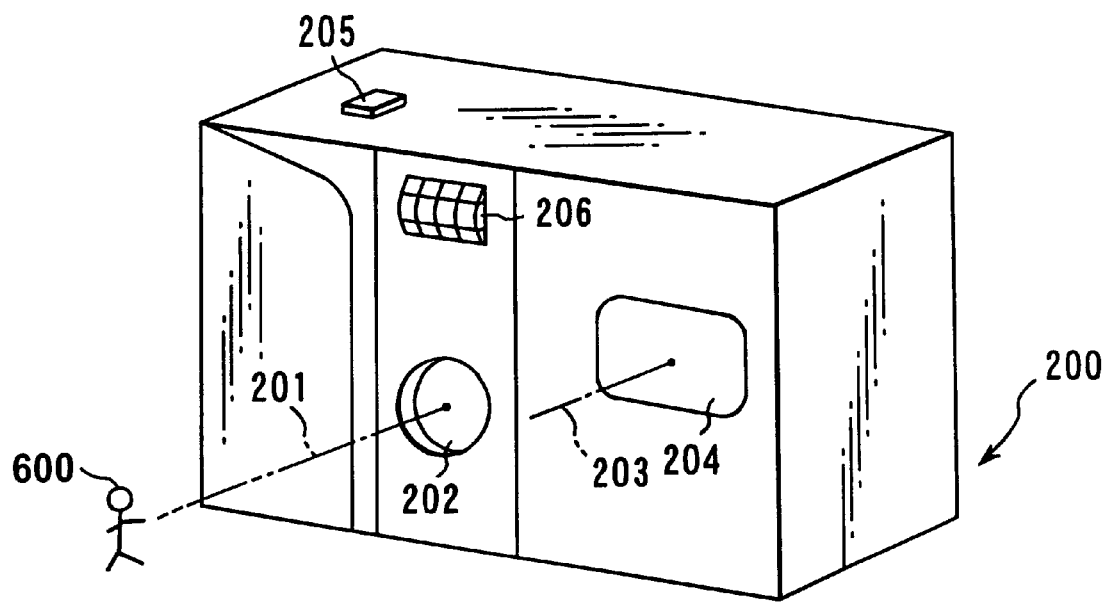
FIGS. 22 to 24 are a conceptual view showing an image taking lens unit of the present invention which is incorporated into an objective optical system of an electronic camera.
Figure 23:
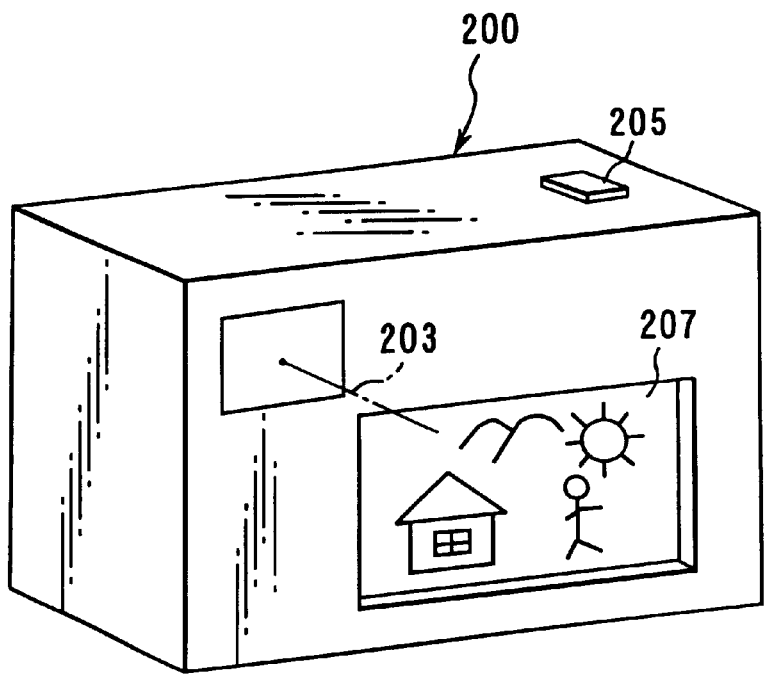
Figure 24:
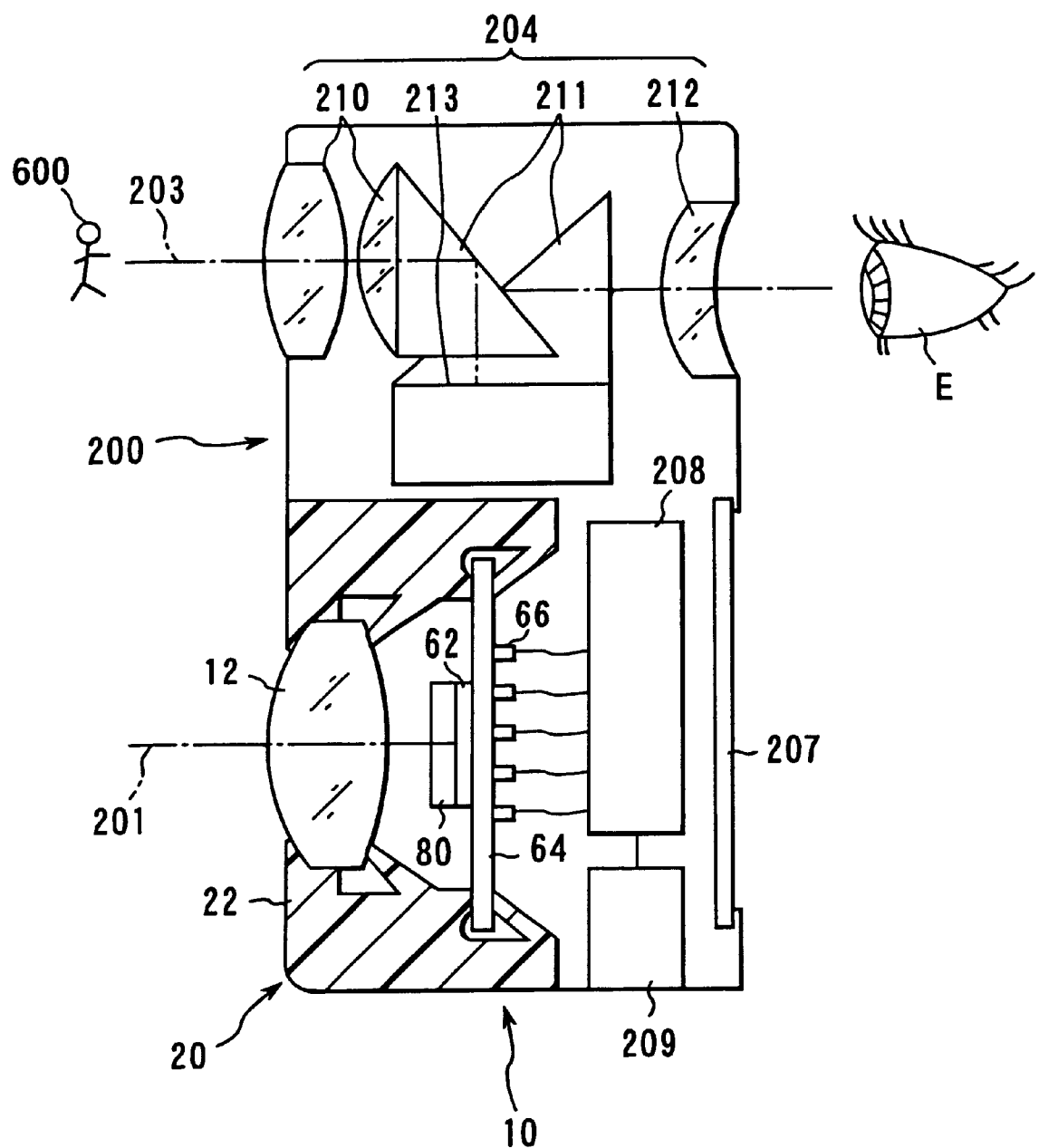

FIGS. 22 to 24 show an electronic camera with the image taking lens unit of the present invention incorporated into an objective optical system.

As shown in FIGS. 22 to 24, an electronic camera 200 comprises an image taking optical system 202 having an image taking optical path, a finder's optical system 204 having an optical path 203 for the finder, a shutter 205, a flash unit 206 and a liquid crystal display monitor 207. By depressing the shutter 205 on the upper section of the camera 200, an image is taken through the lens 12 arranged as an image taking objective optical path in interlock therewith. An objective image formed by the image taking optical system is formed on an image pick-up element chip 62 through the IR (infrared) cut filter 80. An image taking lens unit 10 used here is similar to that of the first embodiment as shown in FIGS. 1A and 1B and the IR cut filter 80 is attached to the chip 62. The reference numeral of each part or section of the lens mount frame 20 is omitted in illustration and an explanation thereof is also omitted. As the image taking lens unit 10 use may be made of the image taking lens unit of other embodiments.

The objective image received at the image taking element chip 62 is displayed as an electronic image on a liquid crystal display monitor 207 provided at the back of the camera through a processing means 208 which is electrically connected to terminals 66. The processing means 208 also controls a recording means 209 for recording, as electronic information, an object image taken by the image pick-up element chip 62. The recording means 209 comprised of a memory provided on the processing means 208 and, as shown, is electrically connected to the processing means 208.

It may comprise a device for electronically making a record on a magnetic recording medium, such as a floppy disk or smart media.

Further, the finder's optical system 204 having the optical path 203 for finder includes an objective optical system 210 for the finder, a Porro prism 211 for erecting an object image 600 formed on the finder's objective optical system, and an eyepiece lens 212 guiding the object image 600 to an observer's eye E. The Porro prism 211 is divided into a front section and a back section and, between these, there is an object image 600 formation surface on which a visual field frame 213 is arranged. The Porro prism 211 has four reflection surfaces and, with the finder's objective optical system 210, gives the formed object image 600 as an erected orthoscopic image.

Such a camera 200 eliminated the need to effect a centering and surface-to-surface spacing adjustment between the lens 12 and the image pick-up element chip 62. Therefore, a readier assembly is ensured and the production of the camera device can be enhanced and the manufacturing cost can be lowered with a consequent commercial advantage.

Further, this camera can eliminate the need to provide the finder's optical system 204 so as to decrease the number of the component parts required and achieve a compact unit at lower costs. In this case, an observer can take a picture while looking in at a liquid crystal display monitor 207.

Figure 27:
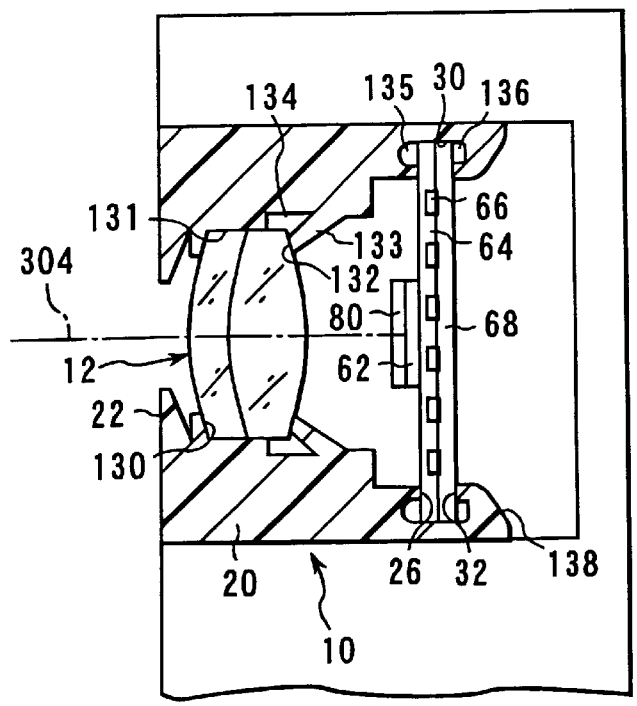
FIG. 27 is a cross-sectional view showing the image taking lens unit incorporated into the personal computer shown in FIGS. 25 and 26.

Next, FIGS. 25 to 27 show a personal computer as one example of an information processing device with an image taking lens unit of the present invention incorporated therein.

As shown in FIGS. 25 to 27, a personal computer 300 includes a keyboard 301 for inputting information from an outside by the operator, information processing means and recording means not shown, and an image taking optical system 303 for taking an image of an operator himself and surrounding image. Here, the monitor 302 may comprise a transmission type liquid crystal display element illuminated from a back plane by a back light not shown, a reflection type liquid crystal display element making a display through the reflection of light from a front plane, a CRT display, and so on. Although, in the Figures, the image taking optical system 303 is incorporated on the right upper portion of the monitor 302, its position is not restricted there and may be located anywhere on the surrounding area of the monitor 302 and around the keyboard 301.

The image taking optical system 303 has, on an image taking optical path 304, an objective lens 12 and an image pick-up element chip 62 for receiving an image. These are incorporated as an image taking lens unit 10 into the personal computer 300. The image taking lens unit 10 is similar to that of the first embodiment as shown in FIGS. 1A and 1B and is so structured that an IR cut filter 80 is attached to the image pick-up element chip 62 and that the lens 12 is of a cemented doublet type. The reference numeral of each section of a lens mount frame 20 is omitted in illustration and an explanation thereof is also omitted.

An object image 600 received at the chip 62 is input to the processing means of the personal computer through terminals 66 and displayed as an electronic image on the monitor. In FIG. 25, an image 305 is displayed as, for example, an image taken by the operator. Further, the image can be displayed on a personal computer of a communication party from a distant site via an internet or a telephone line with the use of the processing means.

Figure 29:
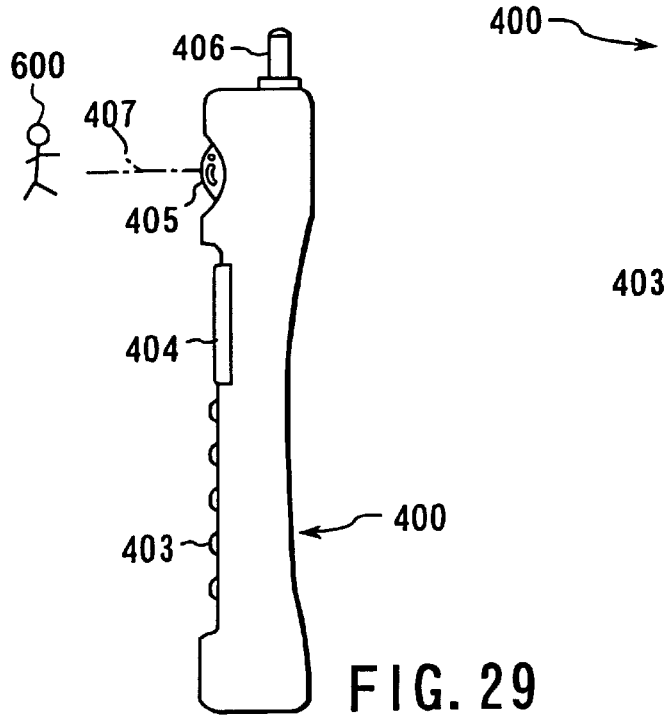
FIG. 29 is a cross-sectional view showing the hand-held telephone device shown in FIG. 28.
Figure 28:
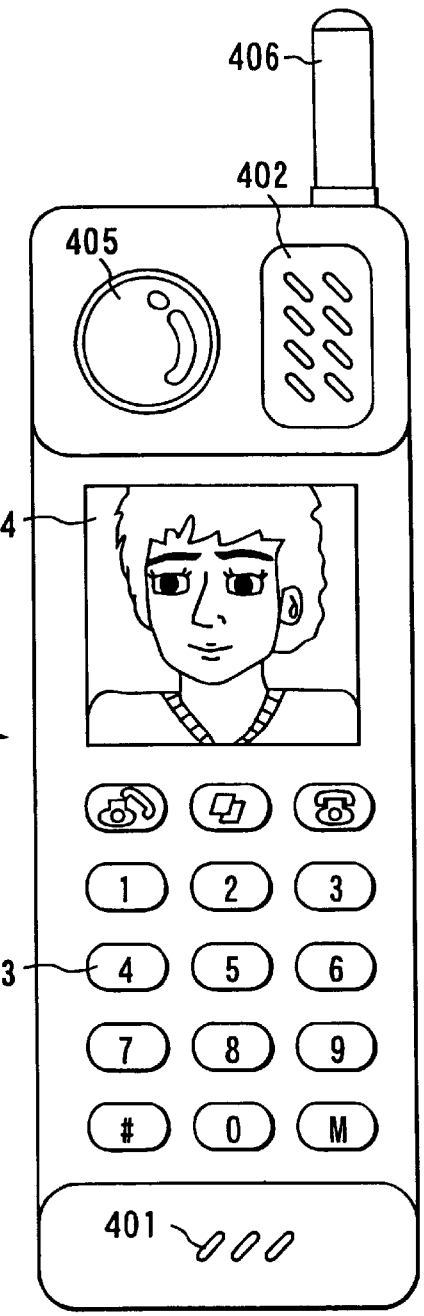
FIG. 28 is a front view showing a hand-held telephone device with the image taking lens unit of the present invention incorporated therein.

FIGS. 28 to 30 show a telephone device as a practical example of the information processing unit with the image taking lens unit of the present invention incorporated therein, in particular, a hand-held telephone device which is handy to the user in carrying it with him or her.

As shown in FIGS. 28 to 30, a hand-held telephone device 400 has a microphone 401 for inputting an operator's voice as information, a speaker section 402 for outputting a voice of a talking party, an input dial 403 for inputting information by the operator, a monitor 404 for displaying an image such as the operator himself or herself or a talking party and/or information such as the telephone number, an antenna 406 for transmitting and receiving a communication wave, and a processing means (not shown) for performing processing on image information, communication information, input signal, etc. Here, the monitor 404 comprises a liquid crystal element. Further, the arranging position of each constituent element is not restricted thereto in particular.

The image taking optical system 405 has a plurality of, for example, two, objective lenses 12 and image pick-up element chip 62 arranged on an image taking optical path 407, the image pick-up element chip receiving an object image. These are included in the image taking lens unit 10 incorporated in the hand-held telephone device 400. That is, the image taking lens unit 10 has a plurality of objective lenses 12, a single image pick-up element mounting substrate 60 and a lens mount frame 20 for retaining these. The lens mount frame 20 has, with respect to these objective lenses 12, corresponding lens positioning faces, that is, vertically positioning section 130 and horizontally positioning section 131. Further, the lens mount frame 20 has a plurality set of projections having lens engaging portion 132 for fixing each of the objective lens 12. The objective lenses 12 may also be fixed by a bonding to the lens mount frame 20 without the projections having the engaging portion 132 as in the case of the second embodiment (FIG. 2A).

An object image received by the chip 62 is input through terminals 66 to the processing means not shown and displayed as an electronic image on the monitor 404 or on a talking party's monitor or on both the monitors. Further, in the case where an image is transmitted to the talking party, a signal processing function for converting the information of the object image which is received at the image pick-up element chip 62 to a transmittable signal is included into the processing means.

Figure 32:
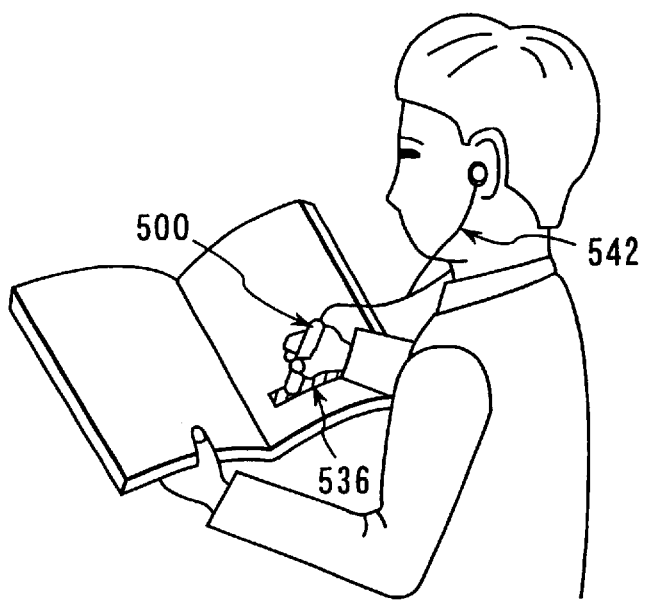
FIG. 32 shows the manner in which the data shown in FIGS. 31A, 31B and 31C is reproduced by a pen-type information reproducing device.
Figure 33:
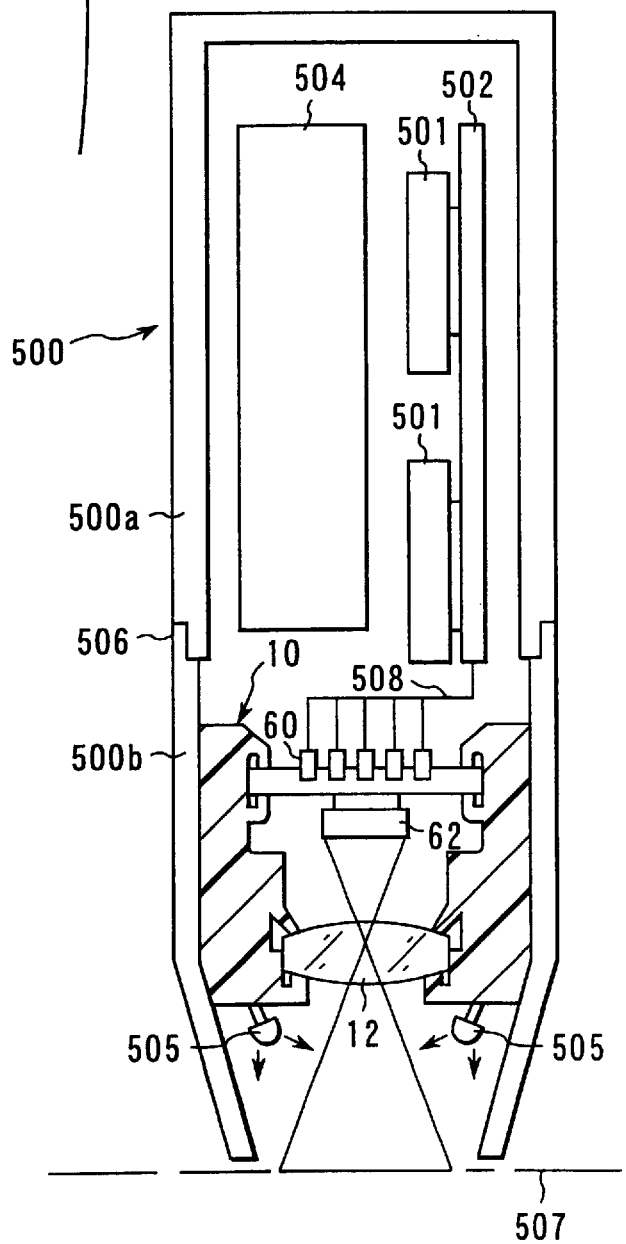
FIG. 33 is a cross-sectional view showing the pen type information reproducing device using the image taking lens unit of the present invention.

FIGS. 31 to 33 show an information reproducing system using an image taking lens unit of the present invention. This information reproducing system reproduces information, such as speech and music, recorded in an optically readable form. The detail of this technique is disclosed in U.S. Pat. No. 5,896,403 which is incorporated herein by reference. U.S. Pat. No. 5,896,403 also discloses a device for recording audio information, such as speech and music, on a paper sheet on a recordable form.

The audio information, such as speech and music, is recorded by such a device on a paper sheet 530 a format as shown, for example, in FIG. 31C. That is, sound data, together with an image 532 and characters 534, converted to a digital signal is printed as recorded data 536 corresponding to the object, a part of which is shown enlarged in FIG. 31A. The recorded data 536 corresponding to the object has a plurality of blocks 538 and each block 538, shown, for example, in FIG. 31B, has a marker 538A, an error correcting code 538B, audio data 538C, x address data 538D, y address data 538E and an error deciding code 538F.

Since the marker 538A functions also as a synchronizing signal, use is made of such a pattern as usually not appearing at a record channel modulation as in a DAT. And the error correcting code 538B is used for the error correction of the audio data 538C. The audio data 538C corresponds to a microphone or audio signal. The x address data 538D and y address data 538E are data representing the position of a corresponding block 538 and the error deciding code 538F is used for making an error decision of the x and y addresses.

The recording data 536 corresponding to the object of such a format is so print-recorded by a printer system or a "process" system for printing as to handle "1" and "0" data as a "black dot" present and "black dot" not-present, respectively, as in the case of, for example, a barcode. Such recording data is referred to as a dot code.

By scanning a dot code 536 by a pen type information reproducing device 500 as shown in FIG. 32, it is possible for the user to listen to a speech output on a speech output device 542, such as an earphone, through the detection of the dot code 536 and its conversion to a sound.

As shown in FIG. 33, the pen type information reproducing device 500 comprises a back section 500a having a processing means 503 including electric circuit component parts 501 and substrate 502 supporting these parts and a battery cell unit 504 and a front section 500b having an image taking lens unit 10 and a light source 505 such as an LED. The front section 500a and rear section 500b are jointed to each other by a joint section 506. The image taking lens unit 10 is substantially the same as in the first embodiment shown in FIGS. 1A and 1B and the reference numerals of their respective members and further explanation are, therefore, properly omitted.

In the pen type information reproducing device, an information recording medium 507 corresponding to the object illuminated by illumination light (illustrated by arrows in FIG. 33) is treated as an object to be imaged and a lens 12 forms an object image on an image pick-up element chip 62. And this image is converted to electric signal and input to a processing means 503 electrically connected by a connection line 508 to terminals 66. As shown in FIG. 32, the operator can listen to sound through an earphone and speaker.

Here, in the pen type information reproducing device, the front section 500a and back section 500b can be separated through the joint section 505. This enables the image taking lens unit 10 to be readily incorporated in the reproducing unit and the component parts to be readily exchanged.

Further, the information reproducing device is not restricted to the pen type and may take various shapes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image taking optical unit, comprising:

an image taking optical system adapted to form an image of an object;

an image pick-up element mounting substrate having an image pick-up element chip adapted to receive light from the object; and a frame member structured to retain both the image taking optical system and the image pick-up element mounting substrate, wherein the image taking optical system includes a lens which has an entrance optical surface on an object side and an exit optical surface proximate the image pick-up element chip, the entrance and exit optical surfaces facing each other;

the frame member has a lens positioning face adapted to position the lens and a substrate positioning face adapted to position the image pick-up element mounting substrate;

the frame member has at least a substrate retaining portion which retains the substrate from an underside in a vertical direction, and is set in the vertical direction such that the substrate positioning face and the substrate retaining portion sandwich and fix the substrate, and the lens positioning face and the substrate positioning face cooperate to align a center of the lens and a center of the image pick-up element chip and position the lens and the image pick-up element chip thereby reserving a distance therebetween.

2. An image taking optical unit comprising:
an image taking optical system adapted to form an image of an object;
an image pick-up element mounting substrate having an image pick-up element chip adapted to receive light from the object; and
a frame member structured to retain both the image taking optical system and the image pick-up element mounting substrate, wherein
the image taking optical system includes a lens which has an entrance optical surface on the object side and an exit optical surface proximate the image pick-up element chip, the entrance and exit optical surfaces facing each other;
the frame member has a lens positioning face adapted to position the lens and a substrate positioning face adapted to position the image pick-up element mounting substrate;
the frame member has at least a lens retaining portion which retains the lens from an underside in a vertical direction, and is set in the vertical direction such that the lens positioning face and the lens retaining portion sandwich and fix the lens; and
the lens positioning face and the substrate positioning face cooperate to align a center of the lens and a center of the image pick-up element chip and position the lens and the image pick-up element chip thereby reserving a distance therebetween.

3. The image taking optical unit according to claim 1 or claim 2, wherein the substrate positioning face comprises a portion of an inner wall surface of the frame member.

4. The image taking optical unit according to claim 3, wherein the image pick-up element mounting substrate has a plurality of side faces, and the substrate positioning face comprises a horizontally substrate positioning section against which the side faces of the substrate are pressed so that a horizontal position, a position in an x direction and/or y direction, of the substrate is determined.

5. An image taking optical unit according to claim 4, wherein the image pick-up element mounting substrate has a rectangular configuration and hence four side faces, and the horizontally substrate positioning section comprises four horizontally substrate positioning portions against which the four side faces of the rectangular substrate are pressed.

6. An image taking optical unit according to claim 5, wherein the image pick-up element mounting substrate has a rectangular configuration having one pair of opposite side faces longer than the other pair of opposite side faces.

7. The image taking optical unit according to claim 3, wherein the image pick-up element mounting substrate comprises terminals for outputting an electric signal obtained by a photoelectric conversion with the image pick-up element chip, the terminals being at a single pair of opposite sides, +x and −x sides or +y and −y sides.

8. The image taking optical unit according to claim 7, wherein the image pick-up mounting substrate comprises a single pair of opposite side faces from which the terminals project, and the horizontally positioning section has a pair of horizontally positioning portions for partially contacting with the opposite side faces except for areas from which the terminals project.

9. The image taking optical unit according to claim 8, wherein the image pick-up element mounting substrate comprises a second pair of side faces from which no terminals project, and the horizontally positioning section have a second pair of horizontally positioning portions for wholly contacting with the second pair of side faces.

10. The image taking optical unit according to claim 3, wherein the image pick-up element mounting substrate has an upper surface on which the image pick-up element chip is mounted and the substrate positioning face has a vertically substrate positioning section contacting with the upper surface of the substrate to determine a vertical position, a position in a z direction, of the substrate.

11. The image taking optical unit according to claim 10, wherein the image pick-up element mounting substrate comprises terminals for outputting an electric signal obtained by a photoelectric conversion with the image pick-up element chip, the terminals being at a single pair of opposite sides, +x and −x sides or +y and −y sides.

12. The image taking optical unit according to claim 11, wherein the image pick-up mounting substrate comprises a single pair of opposite side faces from which the terminals project, and the horizontally positioning section has a pair of horizontally positioning portions for partially contacting with the opposite side faces except for areas from which the terminals project.

13. The image taking optical unit according to claim 12, wherein the image pick-up element mounting substrate comprises a second pair of side faces from which no terminals project, and the horizontally positioning section have a second pair of horizontally positioning portions for wholly contacting with the second pair of side faces.

14. The image taking optical unit according to claim 1 or claim 2, wherein the lens positioning section comprises a portion of an inner wall surface of the frame member.

15. An image taking optical unit according to claim 14, wherein the lens positioning face has a vertically substrate positioning section contacting with the entrance optical surface of the lens so that a vertical position, a position in a z direction, of the lens is determined.

16. The image taking optical unit according to claim 14, wherein the lens has a side face, and the lens positioning face comprises a horizontally substrate positioning section against which the side face of the lens is pressed so that a horizontal position, a position in an x direction and/or y direction, of the lens is determined.

17. The image taking optical unit according to claim 1 or claim 2, wherein the frame member comprises a projection defining a stop of the optical system.

18. The image taking optical unit according to claim 1 or claim 2,
wherein the frame member has a projection,
the substrate retaining portion is formed on the projection, and
the projection comprises a tapered portion which allows the image pick-up element mounting substrate to be easily passed into an inside of the frame member beyond the projection having the substrate retaining portion.

19. The image taking optical unit according to claim 18, wherein the projections having the tapered portion are gradually bent from an inside to an outside on inserting the substrate into the frame member.

20. The image taking optical unit according to claim 1 or 2, wherein the image pick-up element mounting substrate comprises terminals for outputting an electric signal obtained by a photoelectric conversion with the image pick-up element chip, the terminals being at a single pair of opposite sides, +x and −x sides or +y and −y sides.

21. The image taking optical unit according to claim 20, wherein the image pick-up mounting substrate comprises a single pair of opposite side faces from which the terminals project, and the horizontally positioning section has a pair of horizontally positioning portions for partially contacting with the opposite side faces except for areas from which the terminals project.

22. The image taking optical unit according to claim 21, wherein the image pick-up element mounting substrate comprises a second pair of side faces from which no terminals project, and the horizontally positioning section have a second pair of horizontally positioning portions for wholly contacting with the second pair of side faces.

23. An image taking device having an image taking optical unit recited in any one of claims 1 and 2, the image taking device comprising:

a processing device arranged independently and separately from the image taking optical unit, wherein the processing device is configured to process an electronic signal obtained by photoelectric conversion with the image pick-up element chip of the image taking optical unit.

24. An image processing device having an image taking optical unit recited in any one of claims 1 and 2, the image processing device comprising:

a processing device, an input member, a display element and a recording medium which are arranged independently and separately from the image taking optical unit, wherein the processing device is configured to process an electronic signal obtained by photoelectric conversion with the image pick-up element chip of the image taking optical unit, the input member is configured to input an information signal which an operator intends to input to the display element via the processing device, the display element is configured to display, as an image, via the processing device, the information signal and the electronic signal, and the recording medium is configured to record the information signal and/or the electronic signal via the processing device.

25. A personal computer device having an image taking optical unit recited in any one of claims 1 and 2, the personal computer device comprising:

a processing device, an input member, a display element and a recording medium which are arranged independently and separately from the image taking optical unit, wherein the processing device is configured to process an electronic signal obtained by photoelectric conversion with the image pick-up element chip of the image taking optical unit, the input member is configured to input an information signal which an operator intends to input to the display element via the processing device and the input member comprises a keyboard, the display element is configured to display, as an image, via the processing device, the information signal, and the recording medium is configured to record the information signal and/or the electronic signal via the processing device.

26. A telephone device having an image taking optical unit recited in any one of claims 1 and 2, the telephone device comprising:

a processing device, an input member and an antenna which are arranged independently and separately from the image taking optical unit, wherein the processing device is configured to process an electronic signal obtained by photoelectric conversion with the image pick-up element chip of the image taking optical unit, the antenna is configured to transmit and receive a telephone signal, and the input member is configured to input a telephone number by an operator and to send a signal of the telephone number from the antenna via the processing device.

27. An information reproducing device having an image taking optical unit recited in any one of claims 1 and 2, the information reproducing device comprising:

a processing device, an illumination member and a sound generation member which are arranged independently and separately from the image taking optical unit, wherein the processing device is configured to process an electronic signal obtained by photoelectric conversion with the image pick-up element chip of the image taking optical unit, the illumination member is configured to illuminate an object which expresses a speech signal in at least one of a barcode and dot-like form;

the processing device is configured and arranged to make a recognized speech signal from an image of at least one of the barcode and dot-like form, the sound generation member is constructed and arranged to transmit the recognized speech signal as a sound to the ears of an operator.

28. An electronic camera having an image taking optical unit recited in any one of claims 1 and 2, the electronic camera comprising:

a processing device, a display element and a recording medium which are arranged independently and separately from the image taking optical unit, wherein the processing device is configured to process an electronic signal obtained by photoelectric conversion with the image pick-up element chip of the image taking optical unit, the display element is constructed and arranged to display an image taken by the image taking optical unit, the electronic camera can hold, therein, the recording medium configured and arranged to record an image taken by the image taking optical unit, and the processing device comprises a function of displaying, on the display, the image imaged on the image pick-up element chip and a function of recording the taken image on the recording medium.

29. An image taking optical unit comprising:

an image taking optical system adapted to form an image of an object;

an image pick-up element mounting substrate having an image pick-up element chip adapted to receive light from the object; and a frame member structured to retain both the image taking optical system and the image pick-up element mounting substrate, wherein the image taking optical system includes a lens which has an entrance optical surface on the object side and an exit optical surface proximate the image pick-up element chip, the entrance and exit optical surfaces facing each other;

the frame member has a lens positioning face adapted to position the lens and a substrate positioning face adapted to position the image pick-up element mounting substrate;

the substrate positioning face is configured to have a space portion formed on an image taking optical system side; and the lens positioning face and the substrate positioning face cooperate to align a center of the lens and a center of the image pick-up element chip and position the lens and the image pick-up element chip thereby reserving a distance therebetween.

* * * * *